United States Patent
Labrot et al.

(10) Patent No.: US 10,486,395 B2
(45) Date of Patent: Nov. 26, 2019

(54) LAMINATED VEHICLE GLAXING WITH AMOLED SCREEN

(71) Applicant: SAINT-GOBAIN GLASS FRANCE, Courbevoie (FR)

(72) Inventors: Michael Labrot, Aachen (DE); Volkmar Offermann, Eschweiler (DE); Bernhard Reul, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/067,378

(22) PCT Filed: Dec. 22, 2016

(86) PCT No.: PCT/FR2016/053637
§ 371 (c)(1),
(2) Date: Jun. 29, 2018

(87) PCT Pub. No.: WO2017/115040
PCT Pub. Date: Jul. 6, 2017

(65) Prior Publication Data
US 2019/0009503 A1    Jan. 10, 2019

(30) Foreign Application Priority Data

Dec. 30, 2015 (FR) ..................... 15 63480

(51) Int. Cl.
*B32B 17/00* (2006.01)
*B32B 17/10* (2006.01)
*B60R 11/02* (2006.01)

(52) U.S. Cl.
CPC .. *B32B 17/10036* (2013.01); *B32B 17/10348* (2013.01); *B32B 17/10541* (2013.01); *B60R 11/0235* (2013.01); *B60R 2300/20* (2013.01)

(58) Field of Classification Search
None
See application file for complete search history.

(56) References Cited

U.S. PATENT DOCUMENTS 5,898,407 A * 4/1999 Paulus ............... B32B 17/10
343/713
6,495,261 B1 * 12/2002 Gagliardi .......... B32B 17/10018
296/190.1

(Continued)

FOREIGN PATENT DOCUMENTS

CN 202503691 U 10/2012
EP 2 955 064 A1 12/2015

(Continued)

OTHER PUBLICATIONS

International Search Report as issued in International Patent Application No. PCT/FR2016/053637, dated Mar. 10, 2017.

(Continued)

*Primary Examiner* — Thor S Campbell
(74) *Attorney, Agent, or Firm* — Pillsbury Winthrop Shaw Pittman LLP

(57) ABSTRACT

A laminated vehicle glazing includes within the laminate an organic light-emitting diode-based viewing screen. The organic light-emitting diode-based viewing screen is flexible and the laminated glazing includes a first electromagnetic shielding element between the second main face of the first glazing and the rear face and/or between the second main face and the rear surface.

22 Claims, 14 Drawing Sheets

(56) References Cited

U.S. PATENT DOCUMENTS

Figure 1B:
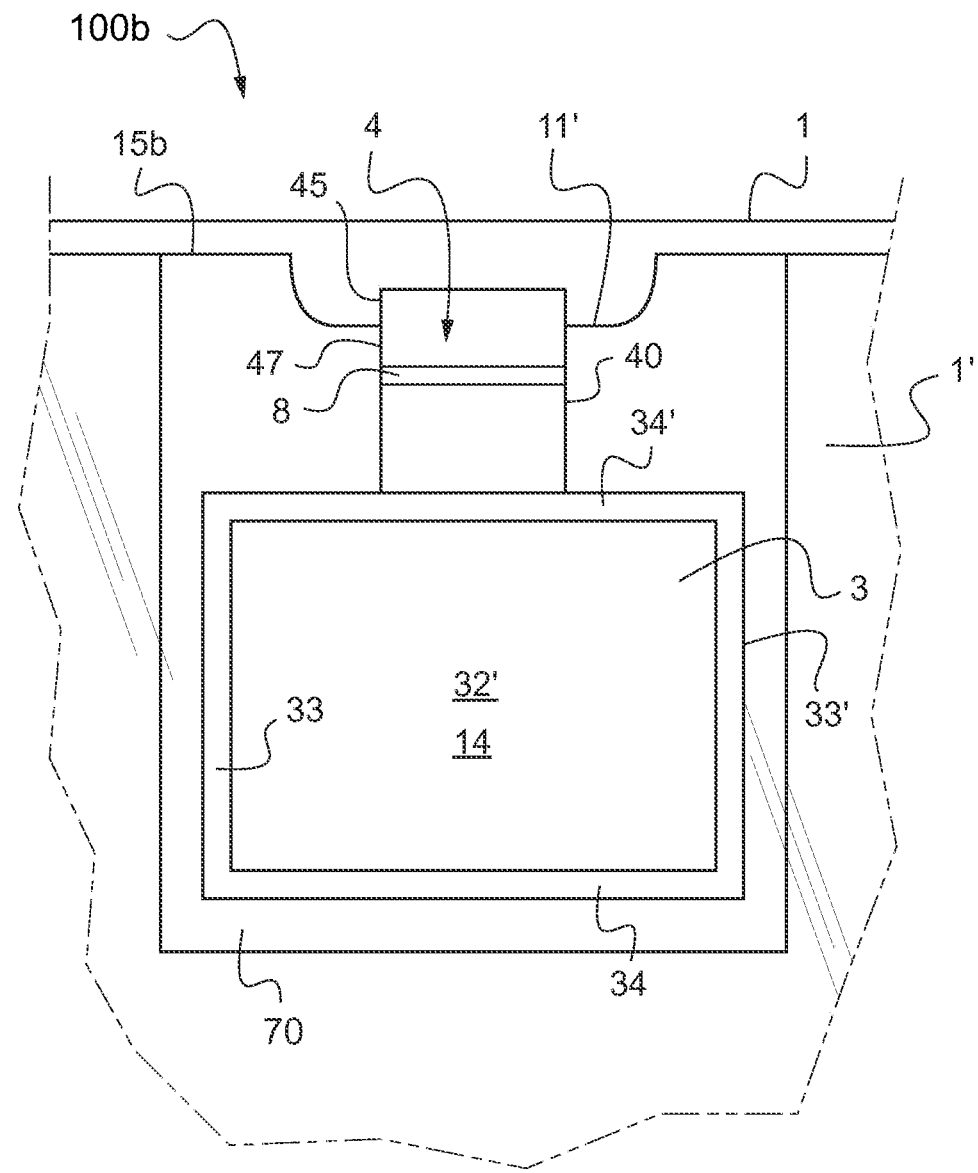

| | | | |
|---|---|---|---|
| 6,559,419 B1* | 5/2003 | Sol | B32B 17/10192 |
| | | | 219/203 |
| 7,379,028 B2* | 5/2008 | Hisaeda | H01Q 1/1271 |
| | | | 219/203 |
| 2006/0208905 A1* | 9/2006 | Ohara | B32B 17/10036 |
| | | | 340/572.8 |
| 2009/0128431 A1* | 5/2009 | Martin | B32B 17/10036 |
| | | | 343/713 |
| 2012/0055998 A1* | 3/2012 | Mieslinger | G06K 19/07749 |
| | | | 235/492 |
| 2013/0301118 A1 | 11/2013 | Ogawa et al. | |
| 2019/0001888 A1* | 1/2019 | Labrot | B32B 17/10036 |
| 2019/0009502 A1* | 1/2019 | Labrot | B32B 17/10036 |
| 2019/0009503 A1* | 1/2019 | Labrot | B32B 17/10036 |
| 2019/0016095 A1* | 1/2019 | Labrot | B32B 17/10174 |
| 2019/0022981 A1* | 1/2019 | Labrot | B60R 1/001 |
| 2019/0022984 A1* | 1/2019 | Labrot | B32B 17/10036 |
| 2019/0022985 A1* | 1/2019 | Labrot | B32B 17/10036 |

FOREIGN PATENT DOCUMENTS

| WO | WO 2004/025334 A2 | 3/2004 |
|---|---|---|
| WO | WO 2010/136702 A1 | 12/2010 |
| WO | WO 2015/041106 A1 | 3/2015 |

OTHER PUBLICATIONS

International Preliminary Report on Patentability and the Written Opinion of the International Searching Authority as issued in International Patent Application No. PCT/FR2016/053637, dated Jul. 3, 2018.

First Office Action as issued in Chinese Patent Application No. 201680004767.9, dated Sep. 26, 2018.

\* cited by examiner

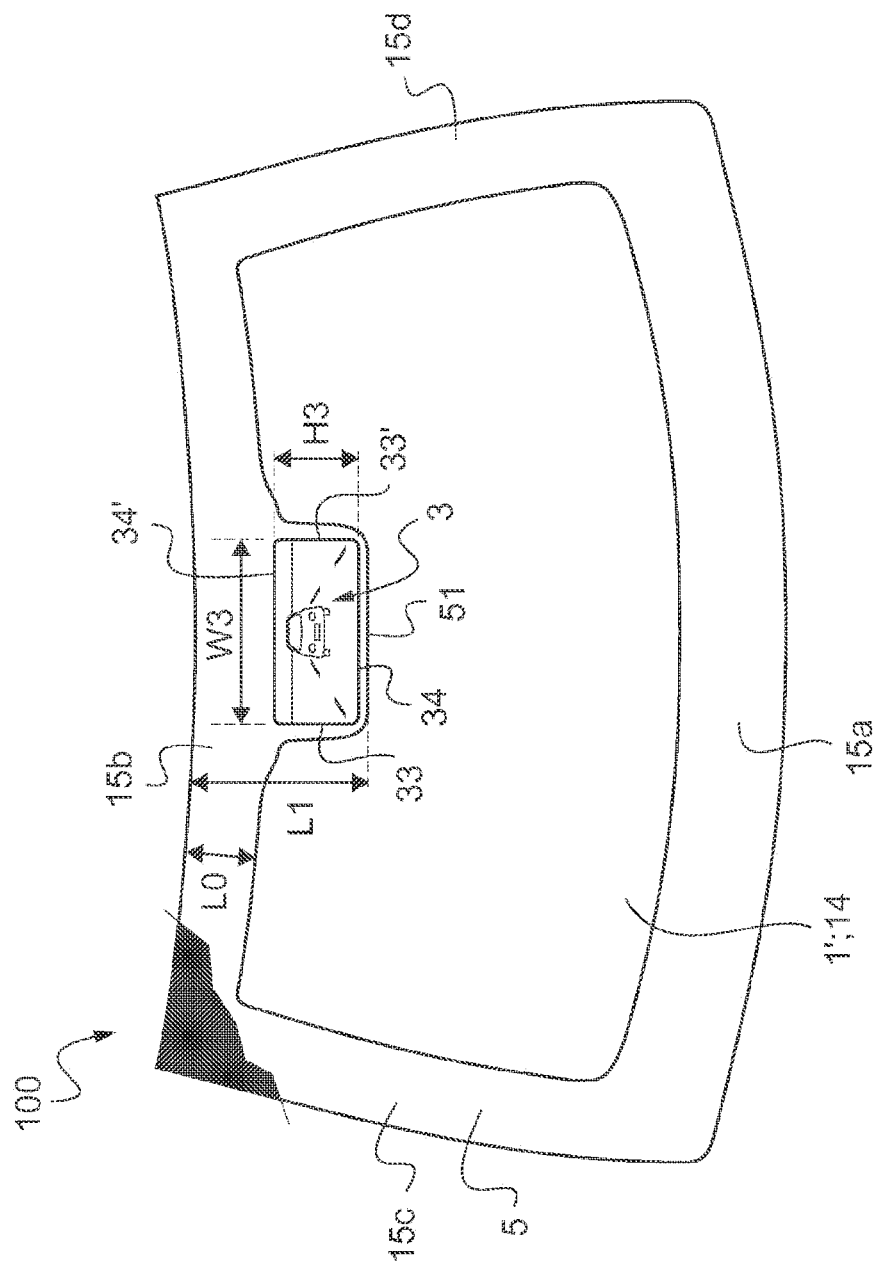

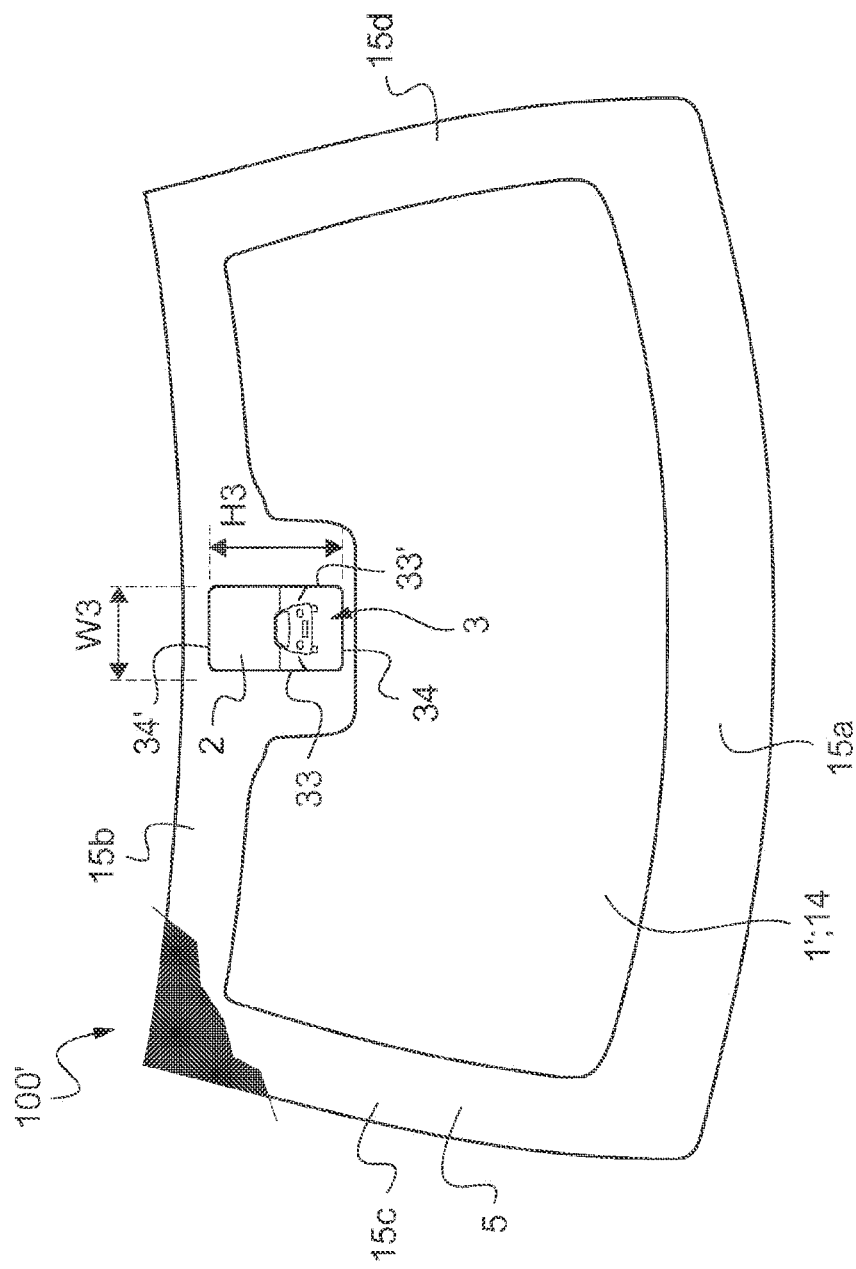

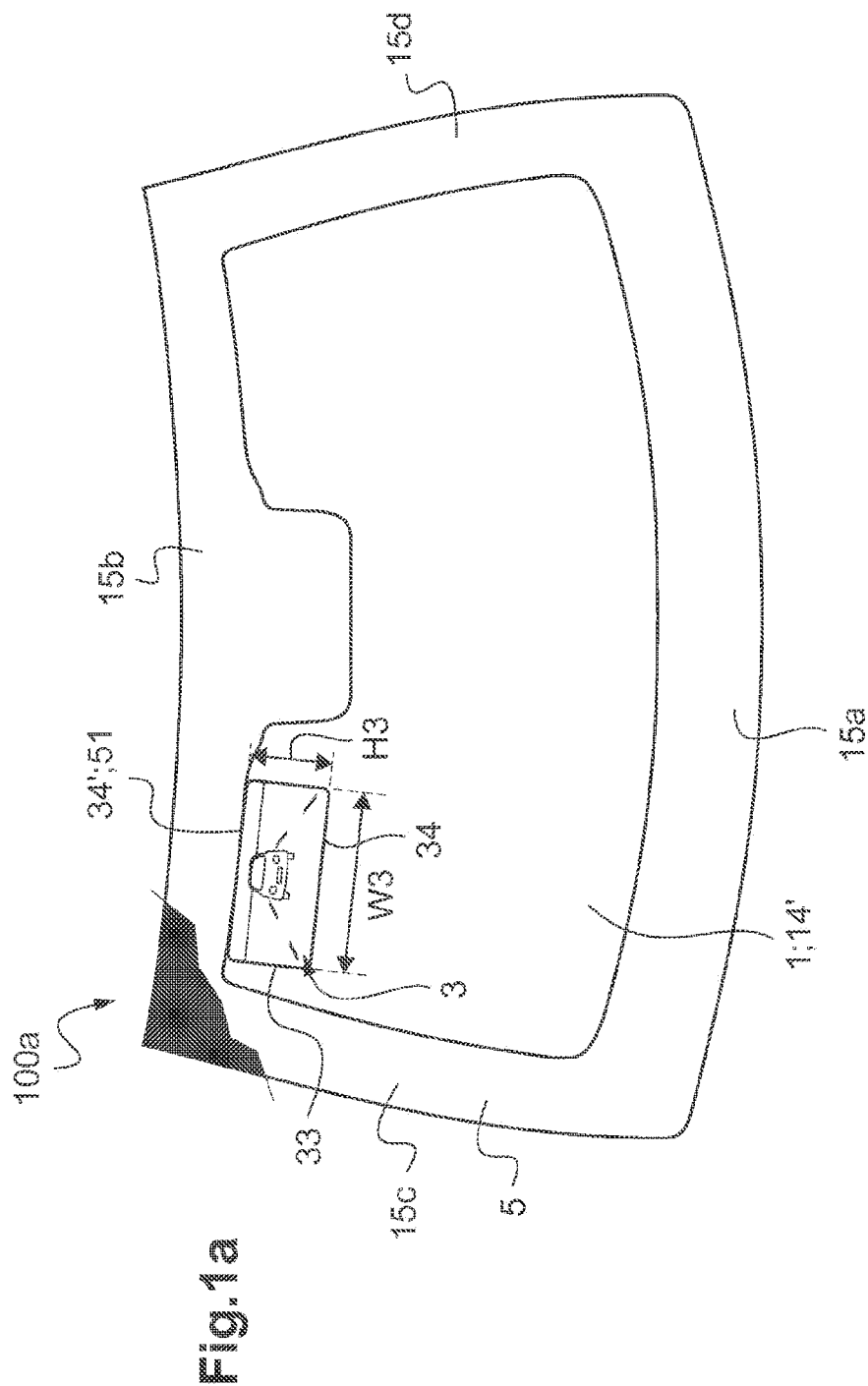

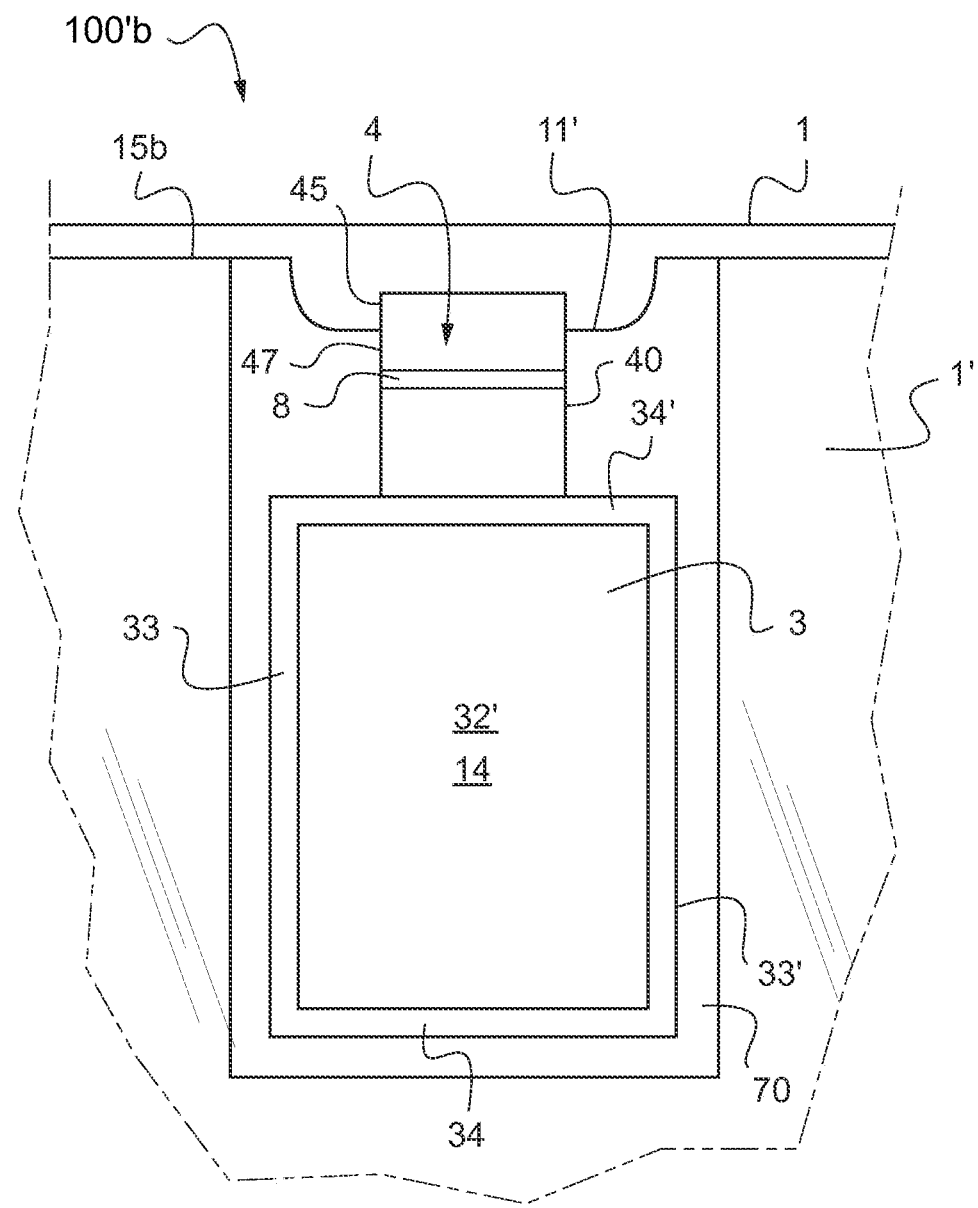
Fig.1'b

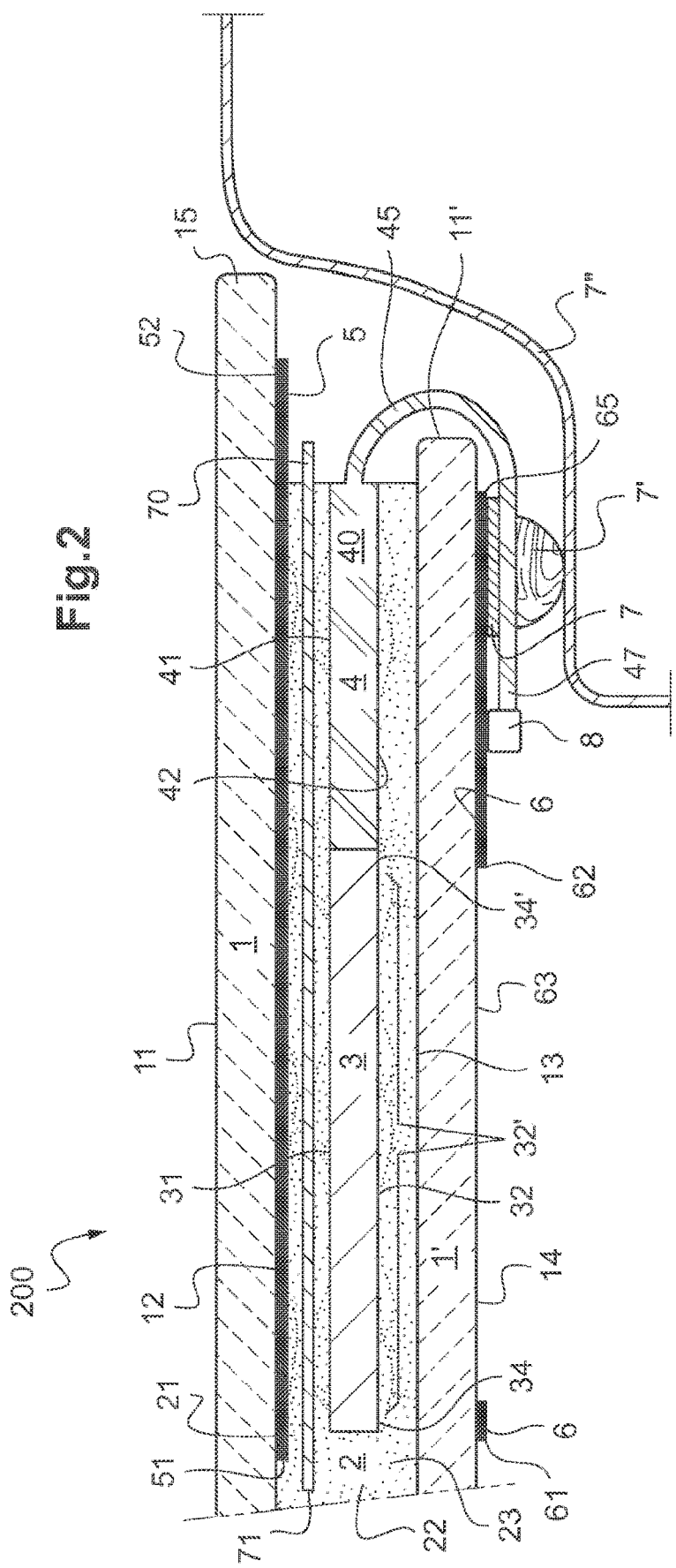

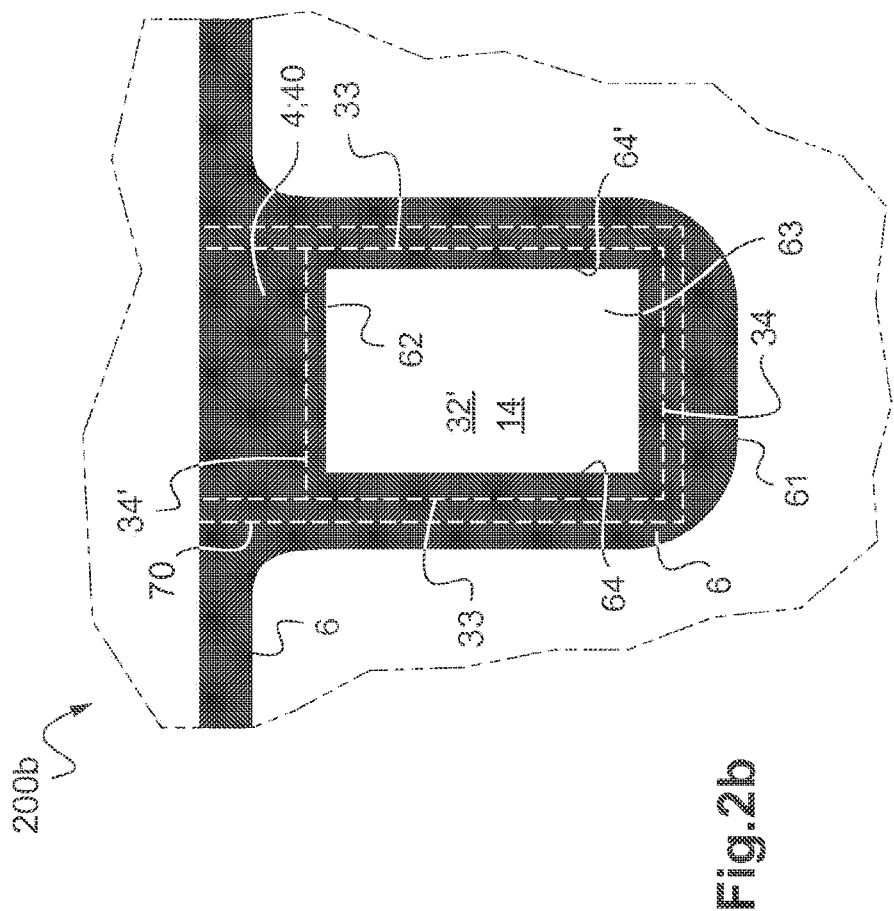

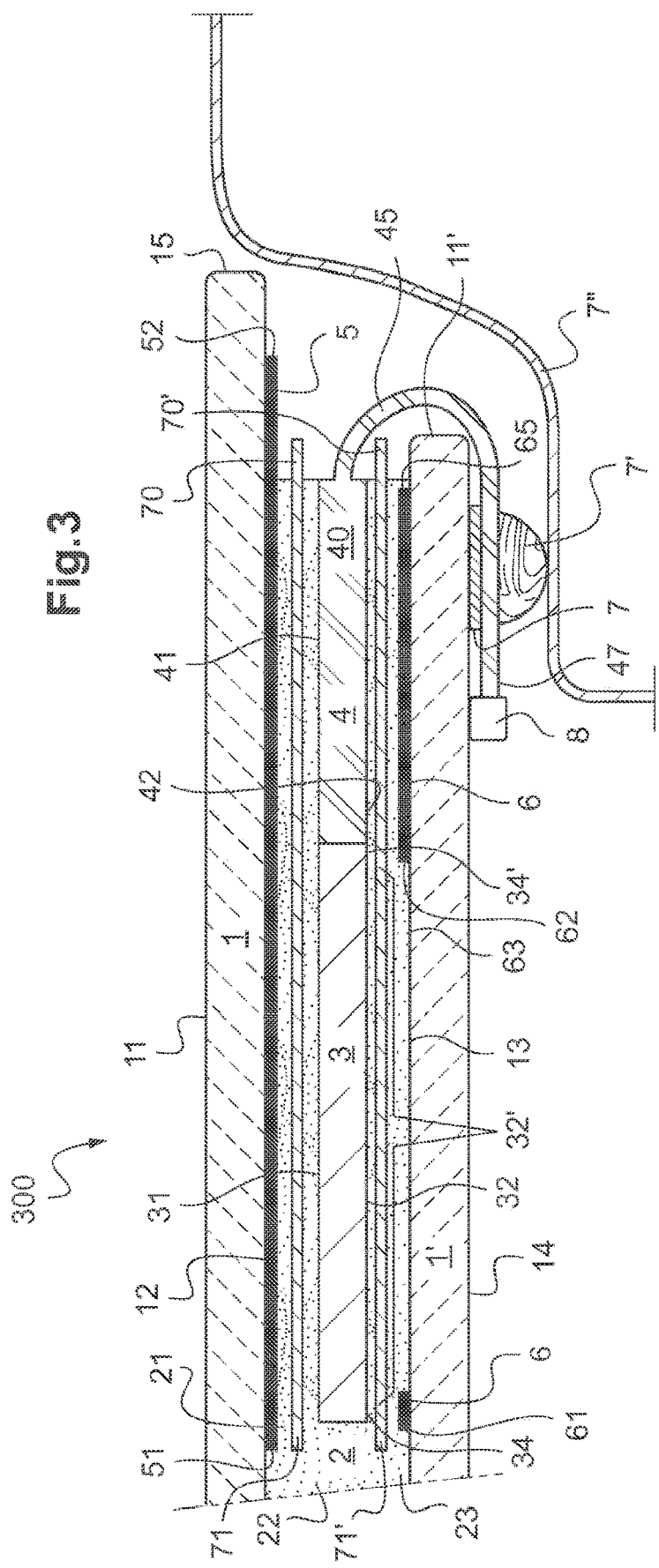

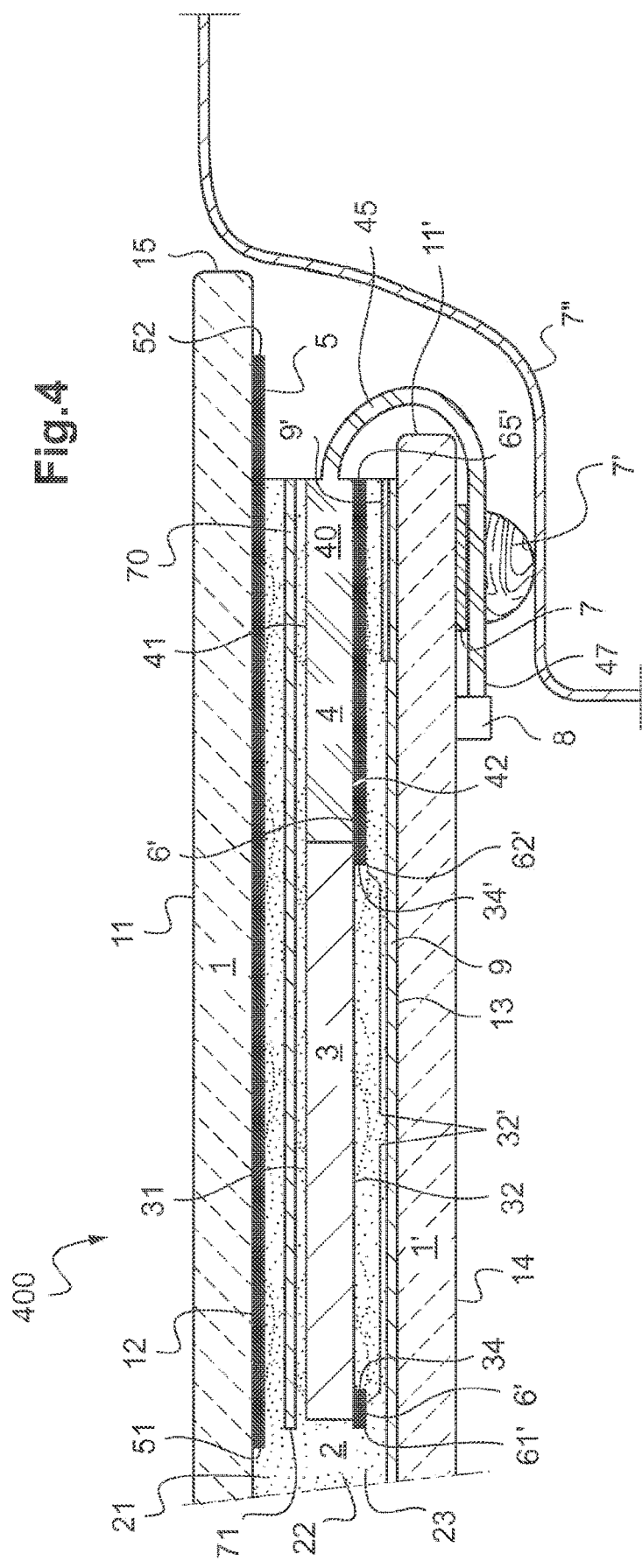

LAMINATED VEHICLE GLAXING WITH AMOLED SCREEN

CROSS-REFERENCE TO RELATED APPLICATIONS

This application is the U.S. National Stage of PCT/FR2016/053637, filed Dec. 22, 2016, which in turn claims priority to French patent application number 1563480 filed Dec. 30, 2015. The content of these applications are incorporated herein by reference in their entireties.

The invention relates to a laminated vehicle glazing and more particularly a laminated vehicle glazing integrating an AMOLED screen.

An ever greater number of intelligent windshields exist which deliver information to the driver.

Document WO2015041106 proposes in particular an automobile windshield comprising an AMOLED (Active Matrix Organic Light Emitting Diode) screen—between the internal faces of the two glazings, screen arranged peripherally and masked in the enameled boundary on face F2 that is to say the internal face of the outermost glazing. The horizontally positioned AMOLED screen is aimed at replacing the internal rear view mirror to see the rear of the vehicle—conventionally in the form of a mirror—and is preferentially situated in the central part along the top longitudinal edge of the windshield. It is coupled with cameras at the rear of the vehicle.

A second AMOLED screen positioned vertically is aimed at replacing the left lateral rear view mirror to see a car on the left side of the vehicle and is situated in the bottom part along the left lateral edge of the windshield and masked by a layer on the internal face of the external glazing, made of enamel.

A third AMOLED screen positioned vertically and aimed at replacing the right lateral rear view mirror is situated in the bottom part along the right lateral edge of the windshield and masked by a layer on the internal face of the external glazing, made of enamel.

The aim of the invention is to improve this laminated vehicle glazing with AMOLED screen notably windshield with AMOLED screen.

For this purpose, the subject of the present invention is a laminated vehicle glazing notably windshield or lateral glazing of a vehicle notably a road vehicle, comprising:
- a first glazing, preferably cambered, preferably of mineral glass, preferably tinted, notably gray or green, with a first main face termed F1 intended to be on the outside of the vehicle and a second opposite main face termed F2, glazing of thickness E1 preferably (especially in the road sector, for an automobile) of at most 2.5 mm, even of at most 2 mm—notably 1.9 mm, 1.8 mm, 1.6 mm and 1.4 mm—or even of at most 1.3 mm or of at most 1 mm,
- a lamination interlayer of polymeric substance (clear, extraclear), preferably thermoplastic, on the face F2 side, of (total) thickness E2 preferably especially in the road sector, for an automobile) of at most 2.2 mm better of at most 2 mm, of at most 1.5 mm or even of at most 0.76 mm, for example composed of several plies for example 3 plies, notably set back from the lip of the second glazing (by at most 5 mm or even by at most 2 mm or by at most 1 mm)
- a second glazing, preferably cambered (like the first glazing), preferably of mineral glass, with a third main face termed F3 on the lamination interlayer side and a fourth opposite main face termed F4, notably intended to be on the inside of the vehicle, optionally tinted (or clear and even with an electroconducting layer on face F3 or even F4), of thickness E1 preferably less than E1, even of at most 2.2 mm (especially in the road sector, for an automobile)—notably 1.9 mm, 1.8 mm, 1.6 mm and 1.4 mm—or even of at most 1.3 mm or of at most 1 mm, the total thickness of the glazings E1+E'1 being preferably (especially in the road sector, for an automobile) strictly less than 4.4 mm, even than 3.7 mm, one at least—and better both—of the first and second glazings being made of glass, the other optionally of organic, polymeric substance such as a polycarbonate,
- between the face F2 and the face F3, a first organic light-emitting diode-based viewing screen termed a flexible AMOLED screen 3, comprising a set of pixels, the first AMOLED screen comprising a (central) zone of dynamic information display, —the AMOLED screen comprising a first flexible support (glass polymeric substance, or indeed even metal) bearing organic light-emitting system(s) between two electrodes—and AMOLED screen of thickness E3 less than E2 preferably subcentimetric and even of at most 0.5 mm, AMOLED screen having a front main face oriented toward F3 and a rear main face oriented toward F2,— the AMOLED screen being covered by a non-zero thickness of lamination interlayer—and preferably within the lamination interlayer—therefore with a non-zero thickness E21 of lamination interlayer between the rear face and F2 and/or with a non-zero thickness E22 between the front face and F3, E2 corresponding to the thickness on the side of the AMOLED screen (notably E2>than E21+E22 and substantially equal to E3), the AMOLED screen is notably arranged peripherally,
- preferably an electrical connection element 4 of the AMOLED screen, with a so-called connecting part between the face F2 and the face F3, of thickness E4 less than E2 and preferably subcentimetric, with a front surface on the face F3 side and a rear surface on the face F2 side, connecting part covered by a non-zero thickness of lamination interlayer and even preferably connecting part within the lamination interlayer (like the AMOLED screen) with a non-zero thickness E41 of lamination interlayer between the rear surface and the face F2 and with a non-zero thickness E42 (preferably identical to the thickness E3) between the front surface and the face F3).

The connecting part is linked (preferably permanent link) to the AMOLED screen and extends (directly) the AMOLED screen in the direction of the lip of the second glazing, and the flexible electrical connection element extending outside of the lip of the second glazing (via a so-called exterior part).

The connection element in particular is for the power supply and (preferably)/or transporting data signals (simultaneously or sequentially) in particular electrical connection element comprising one or more power supply tracks (or "supply lines") and/or one or more tracks for the data signals (or "data lines"), and electronic components (optionally in particular in the connecting part).

According to the invention, the laminated glazing furthermore comprises a first electromagnetic shielding element between the face F2 and the rear face and/or between the face F2 and the rear surface.

Notably the AMOLED screen is in the clear window region or is masked by a, so-called external, periphery masking layer between the face F2 and the rear face of the AMOLED screen and, better, the connecting part is also optionally masked by the external masking layer.

The electromagnetic shielding protects the AMOLED screen and its position in the laminate is more reliable. It can be readily masked by the exterior masking layer (in this case it is transparent or non-transparent).

Preferably, the external masking layer is made of enamel and on face F2 behind the AMOLED screen and the optional other AMOLED screen or screens.

In the off state, the AMOLED screen zone might not be distinguishable from the masking zone further to the rear. Provision may be made to adapt the color of the external masking layer (enamel notably, on face F2) accordingly.

In one embodiment, the AMOLED screen is opaque or transparent with a luminous transmission LT of less than 10% and even less than 5%, the first electromagnetic shielding element is masked by the AMOLED screen and/or the connecting part is opaque or of luminous transmission LT of less than 10% and even than 5%, the first electromagnetic shielding element is masked by the connecting part or in the zone with the first electromagnetic shielding element and the AMOLED screen, the luminous transmission of the laminated glazing is at least 70%.

In one embodiment, the first electromagnetic shielding element comprises electroconducting wires or else comprises an electroconducting element, notably an electroconducting layer (uninterrupted or grid-like) on a (polymeric) flexible film preferably of submicronic thickness.

In one embodiment, the first electromagnetic shielding element, notably transparent (or masked by an internal masking layer), protrudes beyond the edges of the AMOLED screen and/or the connecting part preferably by at least 0.5 mm and by at most 3 or 5 cm.

In one embodiment, the first electromagnetic shielding element is laminated by the lamination interlayer or on the face F2, notably a conducting enamel layer (or any layer printed as an ink, by a liquid route) on a so-called external masking layer of enamel (or any layer printed as an ink, by a liquid route) on the face F2, masking the AMOLED screen and/or the connecting part.

In one embodiment, the first electromagnetic shielding element is on and even integrated into the AMOLED screen and/or is on and even integrated into the connecting part.

In one embodiment, the AMOLED screen is transparent and in the clear window region or in that the (transparent or opaque) AMOLED screen is masked by a so-called external masking layer between the rear face of the AMOLED screen and the face F2 (and also optionally by the first opaque or slightly transparent electromagnetic shielding element), and/or the electrical connection element is masked from the exterior notably by a so-called external masking layer between the rear surface and the face F2 and the technical edge or edges of the AMOLED screen as well as the connection element are masked from the interior by a so-called internal masking layer on face F3 or F4.

In one embodiment, the laminated glazing comprises a plurality of AMOLED screens, notably at the periphery of one and the same longitudinal or lateral edge, each with a first dedicated electromagnetic shielding element or with a first common electromagnetic shielding element (covering the whole).

In one embodiment, the laminated glazing comprises a second electromagnetic shielding element which is transparent between the front face of the AMOLED screen and the face F3 or even the face F4 or which is notably transparent between the front surface of the connecting part and the face F3 or even the face F4.

In a preferred embodiment, the AMOLED screen covers at most the entire peripheral zone visible by the driver (or copilot if AMOLED screen on the latter's side) in the (automotive) road vehicle windshield up to the edge of the transparent central vision zone and more precisely:
- up to the upper edge of the transparent central vision zone if the AMOLED screen is arranged at the top in a horizontal manner on the drivers side (or copilot's side if AMOLED screen on the latter's side) along the drivers (or passengers) side upper longitudinal edge
- up to the lower edge of the transparent central vision zone if the AMOLED screen is arranged at the bottom in a horizontal manner on the drivers side (or copilot's side if AMOLED screen on the latter's side) along the drivers (or passengers) side lower longitudinal edge
- up to the upper edge of the transparent central vision zone if the AMOLED screen is arranged at the top in a horizontal or vertical manner in the central zone of the upper longitudinal edge
- up to the left edge of the transparent central vision zone (respectively right) if the AMOLED screen is arranged in a vertical manner on the left preferably drivers side (respectively right preferably copilot's side) along the left lateral edge, preferably in the bottom part (lower half of the lateral edge) so as to be wider.

The same holds for said other AMOLED screen or screens—if opaque or slightly transparent preferably masked by the external masking layer, preferably on face F2—.

The upper, lower, lateral (left and right) edges (or limits) of the transparent central vision zone are notably defined by a regulating standard. For example for an automotive road vehicle windshield, this involves the restricted zone B defined according to European standard UN-ECE R43 annex 18, in particular page 133 and § 2.4. The upper limit of the transparent central vision zone is preferably defined on the basis of an angle between the horizontal and 7° from a reference point (the drivers eye, eye at the height Z with respect to the seat of the vehicle with Z=665 mm for a tall driver or Z=589 mm for a short driver.

From the edge concerned of the laminated glazing notably road vehicle windshield, the following distances are defined:
- h1 distance between the upper edge and the upper limit of the peripheral zone of vision of the driver (or of the copilot if AMOLED screen on the latter's side) in the vehicle, preferably of at least 15 mm and even of at least 50 or 90 mm
- h'1 distance between the lower edge and the lower limit of the peripheral zone of vision of the driver (or of the copilot if AMOLED screen on the latter's side) in the vehicle preferably of at least 40 mm and even of at least 100 or 200 mm
- h4 distance between the lateral (left or right) edge and the lateral limit of the peripheral zone of vision of the driver (or of the copilot if AMOLED screen on the latter's side) in the vehicle preferably of at least 15 mm and even of at least 20 or 40 mm.

Away from the zone of the AMOLED screen (and/or of said other AMOLED screens) it is possible to form an external peripheral masking layer (on face F2) like enamel, from the lip up to h1, h'1, h4 while protruding beyond for example the (predetermined) vision zone by at most 2 cm as conventionally.

According to the invention, it is possible to increase in a way the width of the external masking layer so as to mask the AMOLED screen (and said other AMOLED screen or screens) and at the maximum up to the limits of the central transparency zone. The external masking is therefore possible from the limit of the restricted vision zone B up to the edge of the (first) glazing.

As a function of the edge concerned of the laminated glazing notably road vehicle windshield, the following distances are defined:
- h2 distance between the upper edge and the upper limit of the central zone of transparency on the driver's side (or copilot's side if AMOLED screen on the latter's side), preferably of at least 120 mm and even of more than 150 mm or 200 mm or 220 mm, the AMOLED screen being above said upper limit and even the optional other AMOLED screen(s),
- h'2 distance between the lower edge and the lower limit of the central transparency zone on the drivers side (or copilot's side if AMOLED screen on the latter's side) preferably of at least 120 mm and even of more than 150 mm or 300 mm, and the AMOLED screen being below said lower limit and preferably the optional other AMOLED screen(s),
- $H_a$ distance between the upper edge and the upper limit of the central transparency zone in the central part (for AMOLED screen in central position), preferably of at least 180 mm and even of at least 250 mm or 300 mm, and the AMOLED screen being between the edge and the upper limit and preferably the optional other AMOLED screen(s),
- h5 distance between the lateral (left or right) edge and the lateral limit of the central zone of transparency on the drivers side (or copilot's side if AMOLED screen on the latter's side) preferably of at least 80 mm and even of more than 120 or 150 mm, and the AMOLED screen between the lateral edge and said lateral limit and preferably the optional other AMOLED screen(s).

The height h6 of the restricted zone B in the top position (between the potentially opaque zone and the most central zone A) can be from 60 mm to 90 mm. It can serve for a (fairly) transparent AMOLED screen (which may ascend into the potentially opaque zone). Preferably the external masking layer is higher than the AMOLED screen.

The height h'6 of the restricted zone B in the bottom position (between the potentially opaque zone and the central-most zone A) can be between 60 mm and 90 mm. It can serve for a (fairly) transparent AMOLED screen (which may descend into the potentially opaque zone). Preferably the external masking layer is lower than the AMOLED screen.

The external masking layer zone is preferably at least as large as the surface of the AMOLED screen, preferably slightly larger:
- for example by at least 5 mm on each side of the AMOLED screen
- and/or for example by at least 5 mm under the most central edge (bottom edge if position at the top of the AMOLED screen, bottom edge if position at the bottom of the AMOLED screen).

The external masking layer can be a solid zone (flat patch) extended by a discontinuous zone in the form of a network of patterns (geometric patterns, round, square, rectangular shape etc) preferably in gradation in the direction of the center of the laminated glazing (windshield). The gradation can be at most 15 mm and even at most 10 mm and at least 3 or 5 mm in width. The gradation can be in the zone of the lower longitudinal edge of at most 30 mm and even of at most 25 mm and of at least 10 or 15 mm in width. Preferably the AMOLED screen is not behind the gradation but behind the solid zone. At the limit only the gradation can protrude beyond the AMOLED screen.

It is possible with several masking zones widened along a reference edge or distinct edges and even a widened masking zone therefore dedicated for each AMOLED screen.

The laminated glazing notably an (automotive) road vehicle windshield of rectangular shape can be:
- of width (horizontal dimension) Lp of at least 1200 mm and of at most 1850 mm and preferably from 1350 to 1550 mm.
- of height (vertical dimension) Hp of at least 800 mm and of at most 1400 mm and preferably from 950 to 1050 mm.

Preferably the AMOLED screen (in an automotive road vehicle windshield) is at least 80 mm by 120 mm.

Preferably the height H3 (and W3) of the AMOLED screen in an automotive road vehicle windshield is adjusted as a function of the standard in force.

Preferably the width W3 of the AMOLED screen in an automotive road vehicle windshield arranged horizontally in the top position (upper edge) is at least 100 mm and better at least 120 mm and even greater than 200 mm, than 350 mm, and even greater than or equal to 500 mm, notably or over the entire drivers side zone between a first visible lateral edge and the top central zone (and even all or part of the top central zone included) or the entire copilot's side zone between the second visible lateral edge and the top central zone (and even all or part of the top central zone included).

Preferably the height H3 of the AMOLED screen in an automotive road vehicle windshield arranged horizontally in the top position (upper edge) is at least 80 mm and better at least 100 mm.

Preferably the width W3 of the AMOLED screen in an automotive road vehicle windshield arranged horizontally in the bottom position (lower edge) is at least 100 mm and better at least 120 mm and even greater than 200 mm, than 350 mm and even greater than or equal to 500 mm, notably or over the entire drivers side zone between the visible lateral edge and a middle zone (and even all or part of the bottom central zone included) or the entire copilot's side zone between the second visible lateral edge and the bottom central zone (and even all or part of the bottom central zone included).

Preferably the height H3 of the AMOLED screen in an automotive road vehicle windshield arranged horizontally in the bottom position (lower edge) is at least 80 mm and better at least 100 mm.

Preferably the width W3 of the AMOLED screen in an automotive road vehicle windshield arranged vertically in the top position (upper edge) in the central zone is at least 100 mm and better from at least 120 mm to 280 mm or even 300 mm.

Preferably the height H3 of the AMOLED screen in an automotive road vehicle windshield arranged vertically in the top position (upper edge) in the central zone is at least 80 mm and better at least 100 mm and even from at least 150 mm and up to 200 mm.

The connection element can be "wireless". A flexible (flat) connector according to the invention is however preferred for the transport of the power signals and/or data signals to one or more induction-based or capacitive etc. wireless connectors. The electrical connection element preferably of submicronic thickness E4 substantially equal to E2 and of thickness E'4 less than E4 beyond the lip of the second glazing, is preferably curved and against or better fixed by gluing on face F4 without stretching as far as the display zone. The exterior part is preferably curved stretches along face F4 side and is against or better fixed by gluing on face F4 without stretching as far as the display zone.

The connection element is advantageously partially covered or shrouded, if appropriate, with any material so as to increase the thickness thereof to a value essentially equal to that of the AMOLED screen notably up to the edge of the laminated glazing.

The connection element is preferably a flexible printed circuit ("fpc"). The connection element is preferably capable of addressing a large number of pixels.

The width of the flexible electrical connection element (notably the connecting part) can be less than or substantially equal to that of the AMOLED screen, typically 50 mm in width for AMOLED widths (horizontal dimension) of at least 100 mm and even more than 150 mm. Large (wide) screens can have several flexible electrical connection elements preferably on one and the same edge of the AMOLED screen.

The distance between the termination of the electrical connection element and the lip of the second glazing is sufficiently large for this termination to be accessible during mounting or dismantling. The total length (unfolded) is adjusted for the connection element to be folded around the second glazing and fixed on face F4. From the exit of the interior glass, a distance of 20 to 150 mm is preferably envisaged.

In one embodiment, the electrical connection element (notably the connecting part) comprises:
  a flexible support preferably polymeric, transparent or otherwise (such as a PET etc) with first front face and first rear face, wires or preferably conducting tracks on the front or rear side,
  optionally electronic components such as transistors,
  the wires or tracks (and electronic components) being covered by an electrically insulating substance, such as a layer of resin or varnish (liquid deposition etc) or a transparent or non-transparent protective film (PET, polyimide etc) for example adhesive-coated.

The connecting part can be linked by any known means to the AMOLED screen: clipping, plug-in. Preferably the connecting part and the AMOLED screen are linked by one or more permanent (solid) links. A link between the connecting part and the AMOLED screen can be made on a technical edge of the AMOLED screen.

Preferably, a polyethylene terephthalate PET, a polyimide, a polyester, a poly(vinyl chloride) PVC, a polycarbonate, polyetheretherketone (PEEK), an acrylate, is chosen as flexible polymeric film, doing so for one at least of the following elements:
  the AMOLED screen (substrate, rear or front protective film: facade film etc),
  the electrical connection element notably the connecting part (substrate, rear or front protective film).

The second glazing preferably comprises a local notch. The connection element exits the lip of the second glazing via the notch of width preferably at least the width of the connection element and preferably at most the width of the AMOLED screen (not including the radii of the fitting).

The dimensions of the notch are therefore adapted:
  width of the notch greater than or equal to that of the connection element;
  depth of the notch greater than or equal to the thickness of the connection element so as to avoid it being visible from the outside in a case when the edge is evident.

In practice the depth of the notch is preferably from 1.5 mm to 3 or even to 2 mm.

The notch zone is preferably (substantially) devoid of lamination interlayer.

The lamination interlayer of polymeric substance is chosen from among polyvinylbutyral, ethylene—vinyl acetate, ionomer polyurethane or resin, alone or in mixtures of several varieties of one of them and/or of several of them; the term "varieties" refers here to variations of the amount of plasticizer, of branchings/linearity, average molecular weight of the molecules. . . .

To ensure good water-tightness, it surrounds and is in contact with the AMOLED screen (rim and front and rear face) indeed even of the electrical connection element of flat connector type.

The lamination interlayer can itself be made of polyvinylbutyral (PVB), polyurethane (PU), ethylene/vinyl acetate copolymer (EVA), formed from one or more films, having for example a thickness of between 0.2 mm and 1.1 mm.

The surface of the lamination interlayer can be smaller than the surface of the laminated glazing, for example leaving a groove (frame-like or banner-like), which is free and therefore unlaminated.

The first glazing like the second glazing may be parallelepipedal, with rectangular, square main faces or sheets or even of any other shape (round, oval, polygonal).

The first and/or second glazing can (according to the esthetic result, the desired optical effect) be a clear glass (of luminous transmission LT greater than or equal to 90% for a thickness of 4 mm), for example a soda-lime standard composition glass such as Planilux® from the company Saint-Gobain Glass, or extra-clear glass (LT greater than or equal to 91.5% for a thickness of 4 mm), for example a soda-lime-silica glass with less than 0.05% of Fe III or of $Fe_2O_3$ such as Diamant® glass from Saint-Gobain Glass, or Optiwhite® glass from Pilkington, or B270® from Schott, or another composition described in document WO04/025334.

The glass of the first and/or second glazing can be neutral (no coloration), or (slightly) tinted notably gray or green, such as the TSA glass from the company Saint-Gobain Glass. The glass of the first and/or second glazing can have undergone a chemical or thermal treatment of the hardening, annealing type or a tempering (for better mechanical strength notably) or be semi-tempered.

The luminous transmission LT can be measured according to ISO standard 9050:2003 using the illuminant D65, and is the total transmission (notably integrated in the visible region and weighted by the sensitivity curve of the human eye), taking account both of direct transmission and of possible diffuse transmission, the measurement being made for example with the aid of a spectrophotometer furnished with an integrating sphere, the measurement at a given thickness thereafter being converted if appropriate to the reference thickness of 4 mm according to ISO standard 9050:2003.

For a laminated vehicle glazing notably windshield or lateral glazing, the LT can preferably be at least 70% and even at least 75% or 80%.

In one embodiment the first glazing is made of mineral glass and the second glazing is made of organic glass (such as PC, PMMA, cyclo-olefin copolymer (COC) or else polyethylene terephthalate (PET) optionally protected by a coating (on face F4).

The exterior glazing can comprise functional thin layers on one or the other of its faces F1 and F2 or else both: it is possible to cite a photocatalytic self-cleaning or hydrophobic layer on face F1.

Preferably the laminated glazing forms a windshield of a road vehicle such as an automobile, a truck, with the first and second glazing cambered and even a PVB lamination interlayer. The camber of the first and second glazings (windshield) can be in one or more directions for example as described in document WO2010136702.

The AMOLED screen can preferably have a thickness of at most 0.8 mm, preferably at most equal to 0.7 mm, and in a particularly preferred manner at most equal to 0.6 mm and even of at least 0.15 mm.

The AMOLED screen preferably comprises a flexible support (polymeric, glass or indeed a metal) bearing a so-called lower electrode (often the anode) of an organic light-emitting system and an upper electrode, while including a matrix of thin-film transistors (TFT). Other functional elements or layers are possible notably:

- between the support and the lower electrode and in the form of a deposition or film: barrier layer (against oxygen, moisture etc),
- on the upper electrode and in the form of a deposition or film: protective layer (against oxygen, moisture etc), for example a deposition (varnish, shrouding, resin etc) and/or facade film (transparent polymeric film: PET etc).

More precisely the pixel preferably comprises side by side two or three of the following systems:

- an organic light-emitting system emitting in the red termed "R",
- an organic light-emitting system emitting in the green termed "G",
- an organic light-emitting system emitting in the blue termed "B",
- an organic light-emitting system emitting in the white termed "W";

in particular RGB,RWB,WBG,RWB,W,BG.

The number of pixels is at least 64×128. The emission is of top emitting type (emission away from the substrate). Front face is intended to mean the viewing face.

Provision may be made for means for modulating the power of the AMOLED screen according to at least two configurations: a configuration for nighttime vision, in which the power of the AMOLED screen is adjusted so that the luminance typically lies between about 10 and about 400 $Cd/m^2$ and a configuration for daytime vision, in which the power of the AMOLED screen is adjusted so that the luminance typically lies between about 10 and about 500 $Cd/m^2$. In daytime vision, it is also possible to adjust the luminance of the AMOLED screen as a function of the exterior illumination.

All information can be displayed on the AMOLED screen (notably on a windshield): exterior and interior atmospheric conditions, vision of the rear environment, vision of the left and right lateral environment (as already indicated), information related to the driving conditions and signposts, technical information relating to the transport vehicle.

The AMOLED screen in particular can have one or more of the following functions (which can be aggregated):

- central vison of the rear,
- display of driving aid information, in particular alerts, detection of obstacles,
- display of information (levels, operating state, state of wear, etc) on the characteristics of the vehicle (engine, wheels, brakes, headlights etc), in particular in case of alert (with a requested stop),
- display of information on the exterior environment: weather, distance to a service station (to an electricity point etc), to a town, to a highway exit,
- display of information on connectivity: access to the network (social network, Internet etc),
- operation in telephone mode: display of the speaker, of a person (police, medical setting) in case of emergency and/or of accident or of a risk situation.

The AMOLED screen and/or another AMOLED screen can also act as copilot side TV, or as operation in telephone mode: display of the speaker, of a person (police, medical setting) in case of emergency and/or of accident or of a risk situation.

The AMOLED screen can display several images as in a television

- main image (central vision of the rear etc)
- inlaid image(s) (lateral vision of the vehicle etc).

The AMOLED screen is notably rectangular or square.

On the front face side, at least one peripheral band termed the technical edge of the AMOLED screen (distinct zone from the active zone, for display) can be masked by a so-called internal masking layer, preferably of enamel, on the face F3 or F4 or by a masking element (opaque layer, film) on the front face. And/or the front surface of the connection element (the connecting part) can be masked by a (same) so-called internal masking layer, preferably of enamel, on the face F3 or F4 or by a masking element (opaque film) on the front surface.

The internal masking layer is optionally a flat patch with an opening revealing the display zone and of width less than or equal to the width of the external masking layer.

The internal masking layer can form not only:

- a masking of the connecting part, opaque or slightly transparent,
- as well as a masking of the technical edges of the AMOLED screen, seen from the interior side of the glazing, notably of the windshield,
- and even, by protruding beyond the technical edge or edges, of the junction between the lamination interlayer and the AMOLED screen, which junction may comprise irregularities and flaws, (and even of the junction between the lamination interlayer and the connecting part).

The masking element can form part of a support film and/or protection such as polyethylene terephthalate (PET) of the AMOLED screen and of the connecting part.

The opaque film can be stuck to the whole of the AMOLED screen and of the connecting part immediately when premounted with a view to its storage, or else form part of a film which has been stuck to this premounted assembly, from which film can then optionally be removed an undesired part precut before assembling the windshield.

The masking element (opaque film etc) can form not only:

- a masking of the connecting part, opaque or slightly transparent,
- as well as a masking of the technical edges of the AMOLED screen, seen from the interior side of the windshield,
- and even, by protruding beyond the technical edge or edges, of the junction between the lamination interlayer and the AMOLED screen, which junction may comprise irregularities and flaws, (and even of the junction between the lamination interlayer and the connecting part).

The opaque film can also be an opacified extension of the transparent polymer material covering the AMOLED screen, that is to say be an integral part thereof.

The opaque film can also alternatively or cumulatively be an extension of the polymer material covering the connecting part, that is to say be an integral part thereof.

The internal masking layer or the masking element (the opaque film) can protrude beyond the technical edges by at least 0.1 mm and even by at most 5 mm or 2 mm.

The two embodiments with internal masking layer/masking element are not necessarily mutually exclusive, and it is possible to contemplate a masking of the technical edge of the AMOLED screen according to the first embodiment and a masking of the connection element (the connecting part) according to the second, or a double masking of the technical edge of the AMOLED screen or of the connection element according to both embodiments at the same time.

The function of the masking is to hide non-useful and unsightly parts of the device so that only the useful part thereof remains visible from the interior; any method suited to the nature of the substrate according to the first or second embodiment can be employed: printing such as ink jet, silk-screen, enamel as on the face F2 . . . .

The internal masking layer can confine itself to masking the technical edge or edges and a part (at least the visible part) of the electrical connection element (of the connecting part), or even protrude optionally a little by at most 1 to 2 cm. The internal masking layer can be in the zone with the AMOLED screen of width less than or equal to that of the external masking so that the external masking is visible by transparency on either side of the AMOLED screen.

An internal and/or external masking layer can be a dark (black) enamel layer, but more broadly a layer of opaque paint or ink, or a tinted or painted polymer layer (e.g. printed PVB), for example polyethylene, polymethyl methacrylate (PMMA).

The external masking layer on face F2 and the internal one on F3 or F4 preferably consist of the same material and even enamel. It is preferred to have an enamel layer at least on face F2 and even on face F4.

In order to limit the warming in the cabin or to limit the use of air conditioning, one of the glazings at least (preferably at least the first glazing) is preferably tinted.

The laminated glazing can comprise a layer which reflects or absorbs solar radiation termed a solar control layer, preferably on face F3 or indeed on face F2 of the second glazing (preferably clear). This electroconducting layer is transparent since it is in part in the clear window region.

The solar control layer can also serve as heating layer with a current infeed at the periphery.

In particular, a heating zone which is connected to at least two electroconducting busbar bars intended for connection to a voltage source in such a way that a current path for a heating current is formed between them.

The width of the busbars is preferably from 2 mm to 30 mm, in a particularly preferred manner from 4 mm to 20 mm and in particular from 10 mm to 20 mm.

A printed busbar preferably contains at least one metal, a metallic alloy, a metallic and/or carbon compound, in particular preferably a noble metal and, in particular, silver. The printing paste preferably contains metallic particles, metallic and/or carbon particles and, in particular particles of noble metal such as silver particles. The thickness of a printed busbar can preferably be from 5 µm to 40 µm, in a particularly preferred manner from 8 µm to 20 µm and more particularly preferably from 8 µm to 12 µm.

As a variant, however, a busbar can also be in the form of a strip of an electrically conducting sheet. The busbar then contains, for example, at least aluminum, copper, tinplated copper, gold, silver, zinc, tungsten and/or tin or alloys of these. The strip preferably has a thickness of 10 µm to 500 µm, in a particularly preferred manner of 30 µm to 300 µm.

The solar control and/or heating layer can comprise a stack of thin layers comprising at least one metallic functional layer such as silver (on F2 or preferably F3). The or each functional layer (silver) is disposed between dielectric layers.

The functional layers preferably contain at least one metal, for example, silver, gold, copper, nickel and chromium, or a metallic alloy. The functional layers in particular preferably contain at least 90% by weight of metal, in particular at least 99.9% by weight of metal. The functional layers can be made of metal for the metallic alloy. The functional layers contain in a particularly preferred manner silver or an alloy containing silver. The thickness of a functional layer (silver etc) is preferably from 5 nm to 50 nm, more preferentially from 8 nm to 25 nm. A dielectric layer contains at least one individual layer made of a dielectric material, for example, containing a nitride such as silicon nitride or an oxide such as aluminum oxide. The dielectric layer can however also contain a plurality of individual layers, for example, individual layers of a dielectric material, layers, smoothing layers, which corresponds to blocking layers and/or antireflection layers. The thickness of a dielectric layer is, for example, from 10 nm to 200 nm. This layer structure is generally obtained through a succession of deposition operations which are performed by a vacuum method such as magnetic cathodic sputtering, supported on-site.

The electroconducting layer is a layer (monolayer or multilayer and therefore stack) preferably of a total thickness of less than or equal to 2 µm, in a particularly preferred manner less than or equal to 1 µm.

The electroconducting layer can have a resistance of 0.4 ohms/square to 10 ohms/ square of sheet and even of 0.5 ohms/square to 1 ohm/square, typically with onboard voltages of 12 V to 48 V or, in the case of electric vehicles, with typical onboard voltages of up to 500 V.

It is possible to aggregate electroconducting layer (in silver etc) on face F2 and/or F3. The electroconducting layer on face F3 is for example a stack marketed by the Applicant Company under the name Climacoat. For example, it can be covered directly with a masking of one or more technical edges of the AMOLED screen (detailed previously) and/or of the connecting part.

Alternatively it is possible to use an electroconducting layer on a support, preferably flexible transparent polymeric (polyethylene terephthalate termed PET etc) between the face F2 and F3 (preferably laminated by the interlayer rather than glued) so as to be a solar control, optionally heating, layer (with at least two busbars notably as aforementioned).

Hence, in one embodiment, the glazing (preferably the, notably road, vehicle windshield) comprises between the face F2 and the face F4, notably on the face F3 or on the face F4, a preferably transparent electroconducting layer or a set of electroconducting wires (metallic preferably) that are preferably transparent or invisible. And optionally opposite the display zone, the electroconducting layer is absent (removed, by laser ablation or any other means etc) notably by means of an opening of size greater than or equal to the display zone and even than the AMOLED screen or the set of electroconducting wires are absent (removed) notably by means of an opening (elimination) of size greater than or equal to the display zone.

The electroconducting wires are advantageously implemented very thin such that they are only slightly or not at all detrimental to transparency, notably a thickness of less than or equal to 0.1 mm, in a particularly preferred manner of 0.02 mm to 0.04 mm, and in particular of 0.024 mm to 0.029 mm. The metallic wires preferably contain copper, tungsten, gold, silver or aluminum or alloys of at least two of these metals. The alloys can also contain molybdenum, rhenium, osmium, iridium, palladium or platinum.

The electroconducting layer can cover at least 50% and even at least 70% or 80% or else at least 90% of the main face of the laminated glazing.

The electroconducting layer notably with said opening can be on the face F3 or on a flexible transparent polymeric film on the face F3 side (within the lamination interlayer preferably, closer to the face F3 than the AMOLED screen) and even be a solar control and/or heating layer which covers notably at least 50% and even at least 70% or 80% or else at least 90% of the face F3.

The opening (the absence of the electroconducting layer or electroconducting wires) makes it possible to remove the coloration due to the reflection of the electroconducting layer. It also increases the luminous transmission LT in this zone.

Preferably the second glazing clad with the electroconducting layer (with optional opening, for solar control and/or even heating) is a clear or extraclear glass, such as a Planiclear from the Applicant company (and the first glazing remains tinted).

The present invention will be better understood and other details and advantageous characteristics of the invention will be apparent on reading the examples of laminated vehicle glazings according to the invention and illustrated by the following figures:

FIGS. 1, 1', 1a, and 8 are each a face-on schematic view of a windshield with AMOLED screen of an automotive vehicle, inside view FIGS. 1b, 1'b, 2a, 2b are face-on and detail schematic views of a windshield with AMOLED screen of an automotive vehicle, inside view FIGS. 2, 3, 4, 5, 6, 7 are sectional and partial schematic views of a windshield with AMOLED screen of an automotive vehicle, inside view.

It is specified that out of concern for clarity the various elements of the objects represented are not necessarily reproduced to scale. For simplicity, the glazings are not represented cambered nor are the flexible elements in the lamination represented curved while adapting to this or these curvatures (in two dimensions) of glazing.

FIG. 1 is a partial schematic representation viewed from the interior of a windshield with AMOLED screen 100 of an automotive vehicle.

The windshield 100 comprises a clear view central zone (central part of the interior glazing therefore face F4 side 14) and an external masking peripheral frame 5, bottom 15a and top 15b, left lateral 15c and right lateral 15d longitudinal edges, frame here masking the rear of the opaque or slightly transparent AMOLED screen 3 (not transparent enough to be in the clear window region). The external masking layer 5, on face F2, thus hides from a view of the exterior of the vehicle the AMOLED screen 3 (and its connector not represented here, preferably in the laminate). The function of the enamel 5 is first to hide, viewed from the face F1, the glue bead fastening the final laminated glazing to the bodywork bay.

The AMOLED screen is arranged in a central position of the top longitudinal edge 15b in a horizontal manner and is rectangular. It is (all or part) in a so-called widened zone the width (vertical dimension) L1 of whose enamel is larger than the adjacent width L0 (for example on the left) serving for the conventional and even copilot side masking.

For example, the horizontal dimension or width W3 is at least 120 mm and even up to 250 mm. The vertical dimension or height H3 is at least 75 mm.

Here the AMOLED screen 3 is down at the bottom-most of the widened peripheral zone. Its bottom edge 34 is in proximity to or on the boundary of the enamel flat patch 51 (solid zone) rather than on the boundary of the optional zone with enamel patterns for example at most 15 mm in width. Its top edge 34' can be as high as possible (to the limit of the zone of vision in the cabin), typically at least 15 mm and better at least 70 mm. This depends on the design of the windshield (size, inclination, clear view desired by the maker).

The edges 53, 53' of the widened enamel zone 50 can protrude beyond the lateral edges 33 and 33' for example by at most 2 cm or even 1 or 0.5 cm (limit of the solid zone). In the off state, the AMOLED screen is dark and is even barely if at all distinguishable from the enamel background 5 (protruding over the sides). It is possible to adapt the enamel color accordingly. Preferably the enamel is opaque and dark.

The AMOLED screen is here in a distinct peripheral zone from the transparent central zone termed zone A $Z_A$ (the most central and in two parts, quadrilateral-like) or of the restricted zone B $Z_b$ (dashed).

On the lit AMOLED screen 3, it is possible to see the central vision of the rear of the vehicle and preferably the lateral visions of the vehicle.

The AMOLED screen can have the rear vision function. It can also have other functions such as: telephone mode, television mode, display of environmental data or data on the road (maps, GPS etc) or on the vehicle, simultaneous display on one or more screen zones (for example in the manner of a mobile telephone screen).

In a variant, not shown, the AMOLED screen is on the drivers side top longitudinal edge. It is higher but can be wider than in the central zone and protrude into the central zone (away from projecting enamel zone).

As a variant, not shown, the AMOLED screen is on the drivers side bottom longitudinal edge in the vision zone. It can be wider than in the central zone.

As a variant, not shown, the AMOLED screen is on the drivers side bottom lateral edge and is arranged vertically as low down as possible in the vision zone.

FIG. 1' is a partial schematic representation viewed from the interior of a windshield 100' with AMOLED screen of an automotive vehicle.

The windshield 100' differs from that in FIG. 1 in that the AMOLED screen is arranged in a vertical manner (H3 larger and W3 smaller). For example H3 is 150 mm to 300 mm and W3 is 60 mm to 120 mm.

As a variant, not shown, two AMOLED screens are disposed in this central zone on either side of the AMOLED screen:
    for example also arranged in a vertical manner
    for example arranged in a horizontal manner FIG. 1*a* is a partial schematic representation viewed from the interior of a windshield 100*a* with AMOLED screen of an automotive vehicle.

The windshield 100*a* differs from that in FIG. 1 in that the AMOLED screen is arranged in a transparent zone (required) for example with the top edge 34' at the limit of the solid zone 51.

FIG. 1*b* is a face-on and detail schematic view of a windshield 100*b* with AMOLED screen of an automotive vehicle, inside view.

For simplicity the exterior masking layer is not represented although it covers the zone of the AMOLED screen (which is peripheral, opaque or slightly transparent). The solid-line elements are seen by transparency through the interior glazing 1'.

As in FIG. 1, the AMOLED screen 3 is arranged horizontally in the central zone of the top longitudinal edge 15*b*. The windshield 100*b* comprises an exterior mineral glass sheet 1 and an interior mineral glass sheet 1' whose upper edge 15*b* exhibits a notch 11'.

The AMOLED screen 3 is sandwiched between the exterior glass sheet 1 and the interior glass sheet 1'. It exhibits a display zone 32' flanked by one or more technical edges (here four) in narrow lateral peripheral 33 and 33', bottom 34, top 34' bands generally at least 0.5 mm in width. It is supplied through an electrical connection element 4 of the AMOLED screen 3 which comprises:
- a flexible so-called connecting part 40 between the face F2 and the face F3 within the lamination interlayer with a front surface on the face F3 side and a rear surface on the face F2 side, of thickness E4 less than that E2 of the lamination interlayer, linked to the AMOLED screen and extending the AMOLED screen in the direction of the lip of the second glazing,
- extended outside of the lip of the second glazing by a flexible so-called exterior part 45, curved and fixed by gluing on face F4 without stretching as far as the display zone 32' via a part 47 terminated by its connector 8 in a zone accessible at the time of mounting/dismantling.

The connection element 4 is a flexible printed circuit (FPC) suitable for the implementation of 2560×1600 pixels (AMOLED screen). The FPC 4 could also advantageously be of the same width as the AMOLED screen 3, so as to facilitate the insertion of the two elements into the lamination interlayer preferably of polyvinylbutyral (PVB set back a little with respect to the glazing edges). The interior glass 1' comprises a notch 11'. The dimensions of the notch 11' are suited to the FPC 4:
- width of the notch 11' greater than or equal to that of the FPC 4;
- depth of the notch 11' greater than or equal to the thickness of the FPC 4 preferably so as to prevent the FPC 4 being visible from the exterior in a case when the edge is evident.

In practice the depth of the notch 11' lies between 1.5 mm and 2 mm. The zone of the notch 11' is substantially devoid of lamination interlayer.

The windshield furthermore comprises an electromagnetic shielding element 70:
- with electroconducting metallic element or one made of conducting transparent oxide, conducting ink, conducting enamel, —uninterrupted layer or grid or even as lines on the face F2 or on a polymeric flexible film It is longer and wider than the screen 3 (and the FPC 4) and preferably of sub-centimetric thickness.

FIG. 1'*b* is a face-on and detail schematic view of a windshield 100' with AMOLED screen of an automotive vehicle, inside view. For simplicity the exterior masking layer is not represented although it covers the zone of the AMOLED screen (peripherally, opaque or slightly transparent). The solid-line elements are seen by transparency through the interior glazing 1'.

It differs from the windshield 100*b* by its arrangement vertically.

FIG. 2 is a sectional and partial schematic view of a windshield 200 with AMOLED screen of an automotive vehicle, inside view.

The windshield 200 comprises:
- a first glazing 1, with a first main face 11 termed F1, intended to be on the outside of the vehicle, and a second opposite main face 12 termed F2, preferably of thickness E1 of at most 2.5 mm, in particular a preferably tinted soda-lime-silica float glass sheet, with a 2.1 mm thickness of glass such as a TSA glass from the Applicant company
- a lamination interlayer of polymeric substance 2, on the face F2 side, of thickness E2 preferably of at least 0.76 mm such as polyvinylbutyral (PVB)
- a second glazing 1', with a third main face 13 termed F3 on the lamination interlayer 2 side and a fourth opposite main face 14 termed F4, intended to be on the inside of the vehicle, preferably of thickness E'1 of at most 2.2 mm, in particular a soda-lime-silica float glass sheet with a 1.6 mm thickness of glass, for example tinted such as a TSA glass from the Applicant company,
- between the face F2 and the face F3 and within the lamination interlayer, an organic light-emitting diode-based viewing screen, comprising a set of pixels, termed a flexible AMOLED screen 3, the AMOLED screen comprising a zone of dynamic information display 32', of thickness E3 less than E2 and preferably subcentimetric, AMOLED screen having a front main face 32 oriented toward the face F3 and a rear face 31 oriented toward the face F2, the AMOLED screen is arranged peripherally,
- within the lamination interlayer an electrical connection element 4 of the AMOLED screen.

The OLED screen 3 is therefore sandwiched between the exterior glass sheet 1 and the interior glass sheet 1'. It exhibits a display zone 32' flanked by one or more technical edges (one, two, three or four) in narrow peripheral bands 34, 34' generally at least 0.5 mm in width (and less than 1 cm preferably). The AMOLED screen 3, flexible and extended directly toward an edge of the glazing, by the connection element 4 which is linked to it and extends outside the lamination.

It is supplied through an electrical connection element 4 of the AMOLED screen 3 which comprises:
- a flexible so-called connecting part 40 between the face F2 and the face F3 within the lamination interlayer with a front surface 42 on the face F3 side and a rear surface 41 on the face F2 side, of thickness E4 less than that E2 of the lamination interlayer linked to the AMOLED screen and extending the AMOLED screen in the direction of the lip of the second glazing 1',
- extended outside of the lip of the second glazing via a so-called exterior part 45 and curved and fixed by gluing (on face F4 without stretching as far as the display zone 32' via a part 47 terminated by its connector 8 in a zone accessible at the time of mounting/dismantling.

The connection element 4 is a flexible printed circuit (FPC) suitable for the implementation of 2560×1600 pixels (AMOLED screen). The FPC 4 could advantageously be of the same width as the AMOLED screen 3, so as to facilitate the insertion of the two elements into the lamination interlayer (set back a little with respect to the glazing edges).

The interior glass 1' comprises a notch 11'. The dimensions of the notch 11' are suited to the FPC 4:
- width of the notch 11' greater than or equal to that of the FPC 4;
- depth of the notch 11' greater than or equal to the thickness of the FPC 4 preferably so as to prevent the FPC 4 being visible from the exterior in a case when the edge is evident.

In practice the depth of the notch 11' lies between 1.5 mm and 2 mm. The zone of the notch 11' is substantially devoid of lamination interlayer.

The AMOLED screen 3 has for example a thickness E3. The connecting part 40 can be less thick. It is optionally covered or shrouded with any material so as to increase (if necessary) the thickness E4 thereof to a value substantially equal to E3. If E4 is equal of 0.4 mm, E3 is from 0.38 to 0.40 mm. A central ply 22 of 0.38 mm is for example used for the lamination, with a reserve to house the AMOLED screen and the connecting part and two external plies 22, 23 of 0.17 mm or 0.38 mm. One of the external plies can be thicker for example 0.76 mm.

It is possible to have more than 3 plies (if insertion of a polymeric film such as a PET etc) or for more mechanical protection.

When the AMOLED screen is at most 0.15 mm or even 0.2 mm in thickness, it is optionally possible to eliminate the central ply during assembly.

The first glazing (exterior) 1 comprises an external masking layer 5 on face F2, opaque, of black enamel preferably,
- with an edge 51 toward the center of the windshield
- and an edge 52 on the lip side of the glazing 15 for example at a distance of at most 3 or 1 mm from the lip 15.

It hides not only the glue bead 7' of the trim 7" but also the AMOLED screen 3 (opaque or slightly transparent), the connecting part 40 and the off-glazing part 45 of the FPC and the part 47 and its connector 8.

The external masking layer 5 is preferably a solid zone (a flat patch) rather than a network of patterns. Beyond the edge 51 it can be extended by a network of patterns (made of the same substance) for example in gradation over a width of at most 15 mm and even 5 mm and even larger if the lip 15 is the lower longitudinal edge.

The second glazing 1' (interior) comprises on face F4 an internal masking layer 6 on face F4 (or as a variant F3), opaque, of black enamel preferably, with
- an edge 61 toward the center of the windshield
- an edge 65 on the notch side.

This internal masking layer 6 masks from the interior the entire surface of the connecting part 40 in particular that which is in the vision zone (away from zone with trim or optional casing). It can be wider than the connecting part.

This internal masking layer also masks from the interior the technical edges 34, 34' of the AMOLED screen. It can protrude for example by at most 10 mm opposite the lamination interlayer over the perimeter of the technical edges in order to mask lamination defects.

When the internal masking layer 6 is thus on the perimeter of the AMOLED screen 3, an opening 63 has therefore been formed (masking or post fabrication of the layer) revealing the display zone 32'.

It can also protrude further beyond the technical edges so that its width is (almost equal) to that of the external masking layer 5 on either side of the AMOLED screen (and/or of the connecting part).

The internal masking layer 6 is preferably a solid zone (a flat patch) rather than a network of patterns. Beyond the edge 61 it can be extended by a network of patterns (made of the same substance) for example in gradation over a width of at most 15 mm and even 5 mm and even larger if the lip of the notch 11' is the lower longitudinal edge.

The windshield furthermore comprises an electromagnetic shielding element 70 at the rear:
- with electroconducting metallic element or one made of conducting transparent oxide, conducting ink, conducting enamel, —uninterrupted layer or grid or even as lines on a polymeric flexible film such as a PET This element 70 is longer and wider than the screen 3 (protrudes via edge 71) and the FPC 4 and preferably of subcentimetric thickness.

It is within the PVB interlayer 2.

Figure 2A:
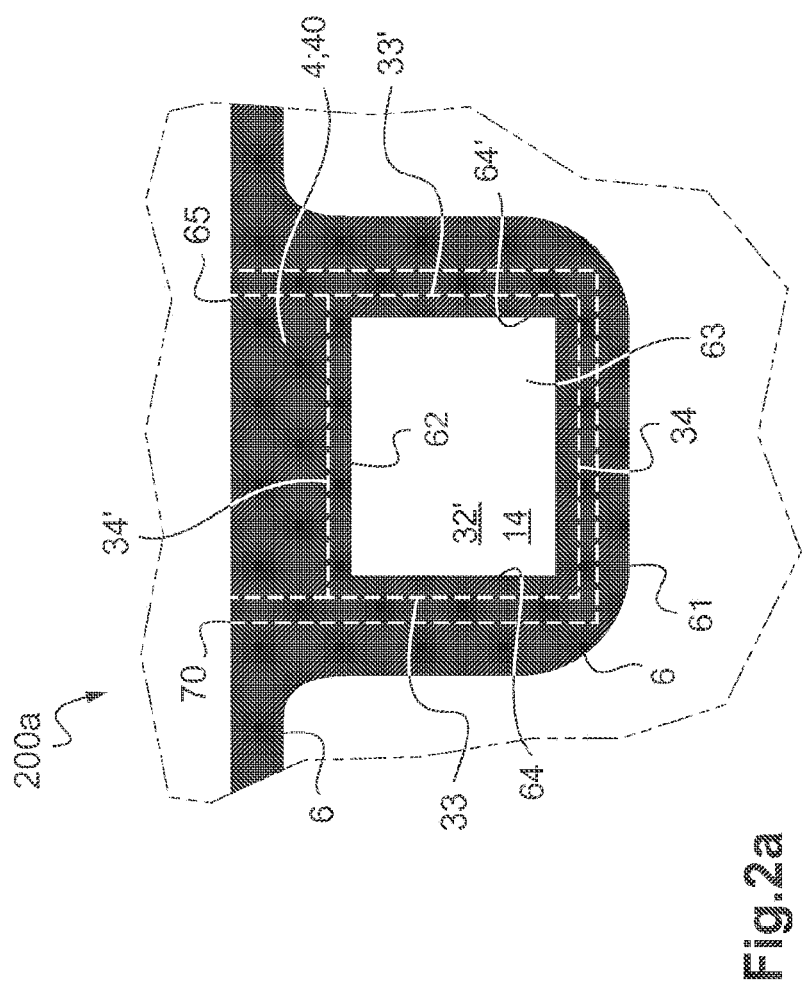

FIG. 2*a* is a face-on and detail schematic view of a windshield with AMOLED screen of an automotive vehicle, inside view.

It illustrates the possible extent of the internal masking layer 6 on either side of the technical edges 33, 33', 34, 34' of the AMOLED screen here arranged horizontally along an upper longitudinal edge, in a central or non-central position.
- lateral edges 64 and 64' protruding preferably by at least 3 mm and
- bottom edge 61 protruding preferably by at least 3 mm.

The electromagnetic shielding element 70 (protruding from the screen a little) is also masked here.

The internal masking layer 6 is alternatively a strip of given width with an opening for the AMOLED screen,
- strip along the upper or lower longitudinal edge, the AMOLED screen arranged horizontally being on the driver's and/or copilot's side
- strip along the left or right lateral edge, the AMOLED screen arranged vertically on the drivers and/or copilot's side.

FIG. 2*b* is a face-on and detail schematic view of a windshield 200*b* with AMOLED screen of an automotive vehicle, inside view.

It differs from the windshield 200*a* by its arrangement vertically. The size of the shielding 70 is adapted.

FIG. 3 is a sectional and partial schematic view of a windshield 300 with AMOLED screen of an automotive vehicle, inside view.

The windshield 300 differs from the windshield 200 firstly in that the internal masking layer is on face F3 instead of face F4.

It differs from the windshield 200 also in that it comprises an electromagnetic shielding element 70' at the front 70':
- with electroconducting metallic element or one made of conducting transparent oxide, conducting ink, conducting enamel, -uninterrupted layer or grid or even as lines on a polymeric flexible film such as a PET This element 70 is longer and wider than the screen 3 (protrudes via edge 71) and the FPC 4 and preferably of subcentimetric thickness.

It is within the PVB interlayer 2.

FIG. 4 is a sectional and partial schematic view of a windshield 400 with AMOLED screen of an automotive vehicle, inside view.

It differs from the windshield 200 in that the internal masking layer 6 is replaced with an opaque (opacified) film 6' of polyethylene terephthalate (PET) that can be stuck to the whole of the AMOLED screen 3 and of the FPC 4 immediately when premounted with a view to its storage, or else form part of a film which has been stuck to this premounted assembly, from which film can then optionally be removed an undesired part precut before assembling the windshield.

The opaque film 6' constitutes:
a masking of the FPC 40, opaque or slightly transparent, and of the junction between the PVB 22 (central part) and the AMOLED screen 3, which can comprise irregularities and flaws,
as well as a masking 61', 62' of the technical edges 34 of the AMOLED screen 3, seen from the interior side of the windshield.

The opaque film 6' can also be an opacified extension of the transparent polymer material covering the AMOLED screen, that is to say be an integral part thereof.

The opaque film 6' can also alternatively or cumulatively be an extension of the polymer material covering the FPC, that is to say be an integral part thereof.

Moreover, the face F3 is furnished with an electroconducting layer 9 and optionally with a current infeed 9' for the latter; this layer can consist of a stack which reflects solar radiation, in silver or other, or with a heating coating/stack furnished for this purpose with its current infeed 9'. It can be covered directly with a masking of the technical edge of the AMOLED screen mentioned previously.

Figure 5:
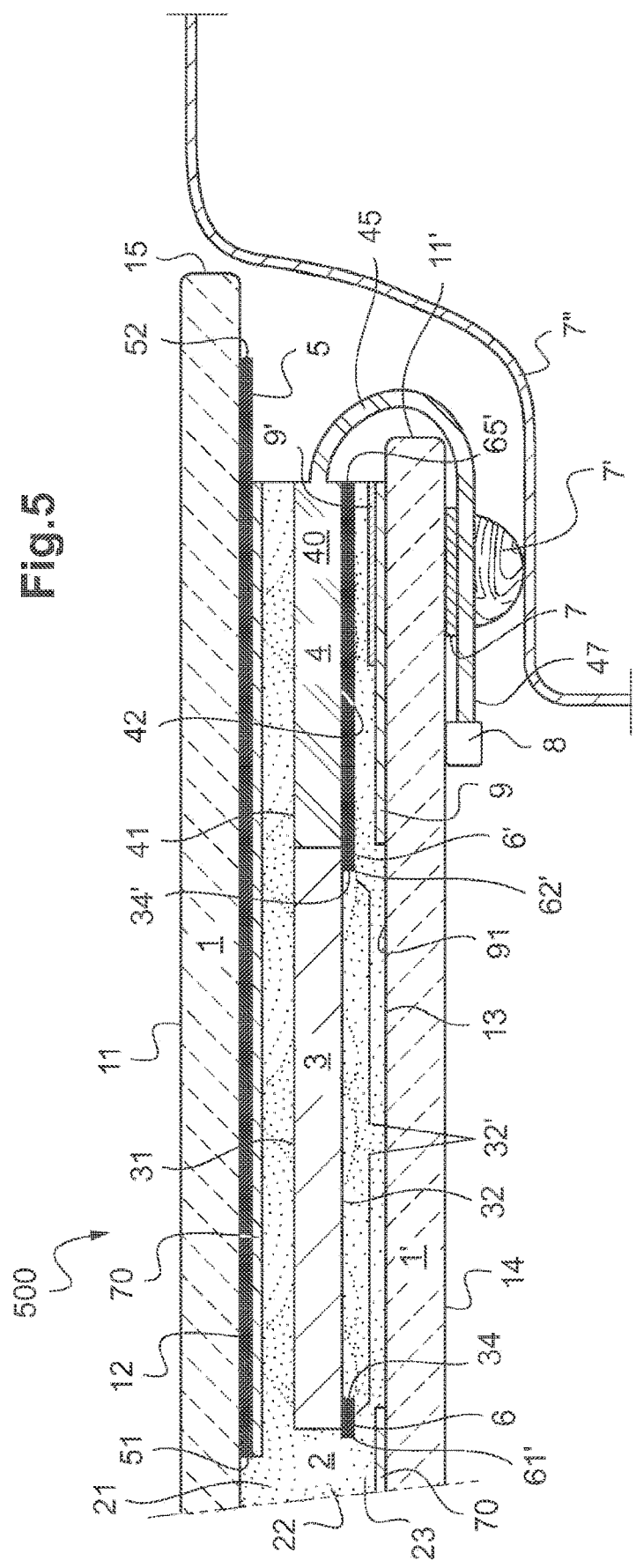

FIG. 5 is a sectional and partial schematic view of a windshield 500 with AMOLED screen of an automotive vehicle, inside view.

It differs from the previous windshield 400 in that for esthetic reasons the electroconducting layer is absent at least in the zone 91 opposite the display zone 32'.

Furthermore, the electromagnetic shielding element 70 is a conducting enamel on the enamel 5.

Figure 6:
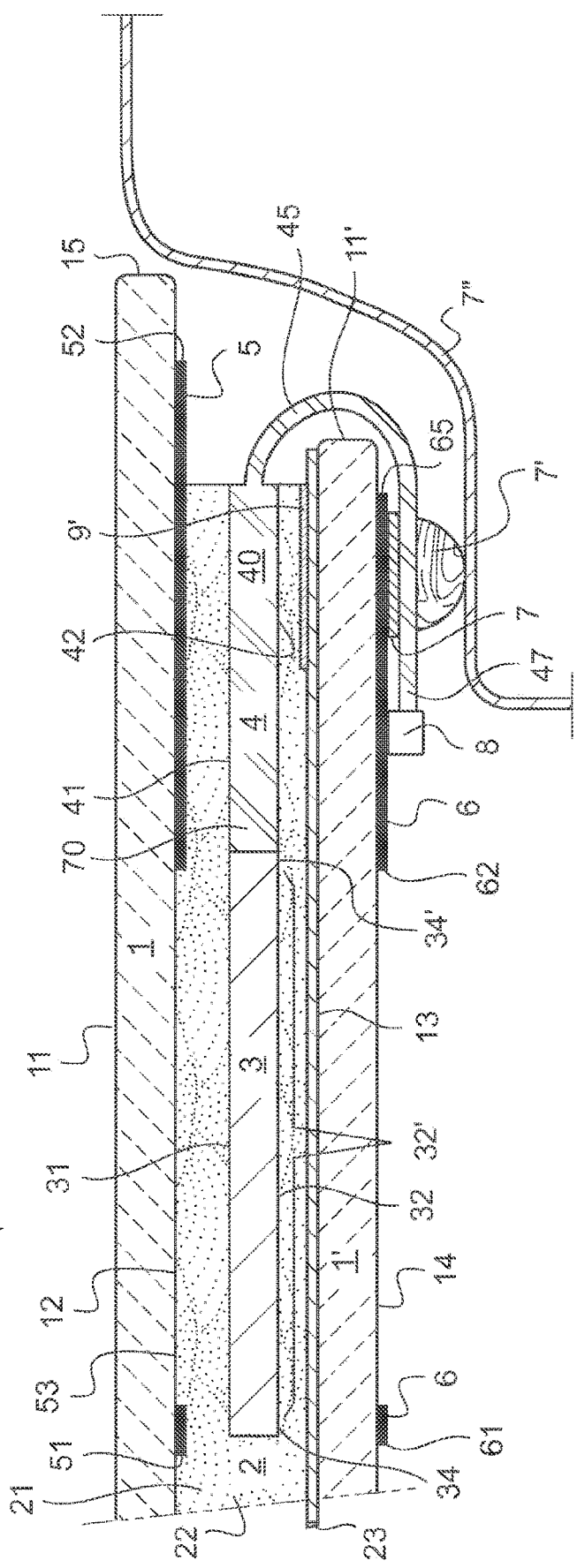

FIG. 6 is a sectional and partial schematic view of a windshield 600 with AMOLED screen of an automotive vehicle, inside view.

It differs from the windshield 200 in that the AMOLED screen 3 is placed in a transparent vision zone of which without external masking layer 6 behind.

However the masking of the exterior of the technical edges 34, 34' (and even of the PVB 22) by the external enamel layer 5,51 can be accepted. Hence the enamel layer 5 can have an opening 53 facing the AMOLED screen zone. And the masking of the interior of the technical edges 34, 34' (and even of the PVB 22) by the internal enamel layer 6,61 can be accepted. Hence the enamel layer 6 can have an opening 63 facing the AMOLED screen zone.

The electromagnetic shielding element 70 here is integrated with the FPC 4 (and even with the AMOLED screen).

Figure 7:
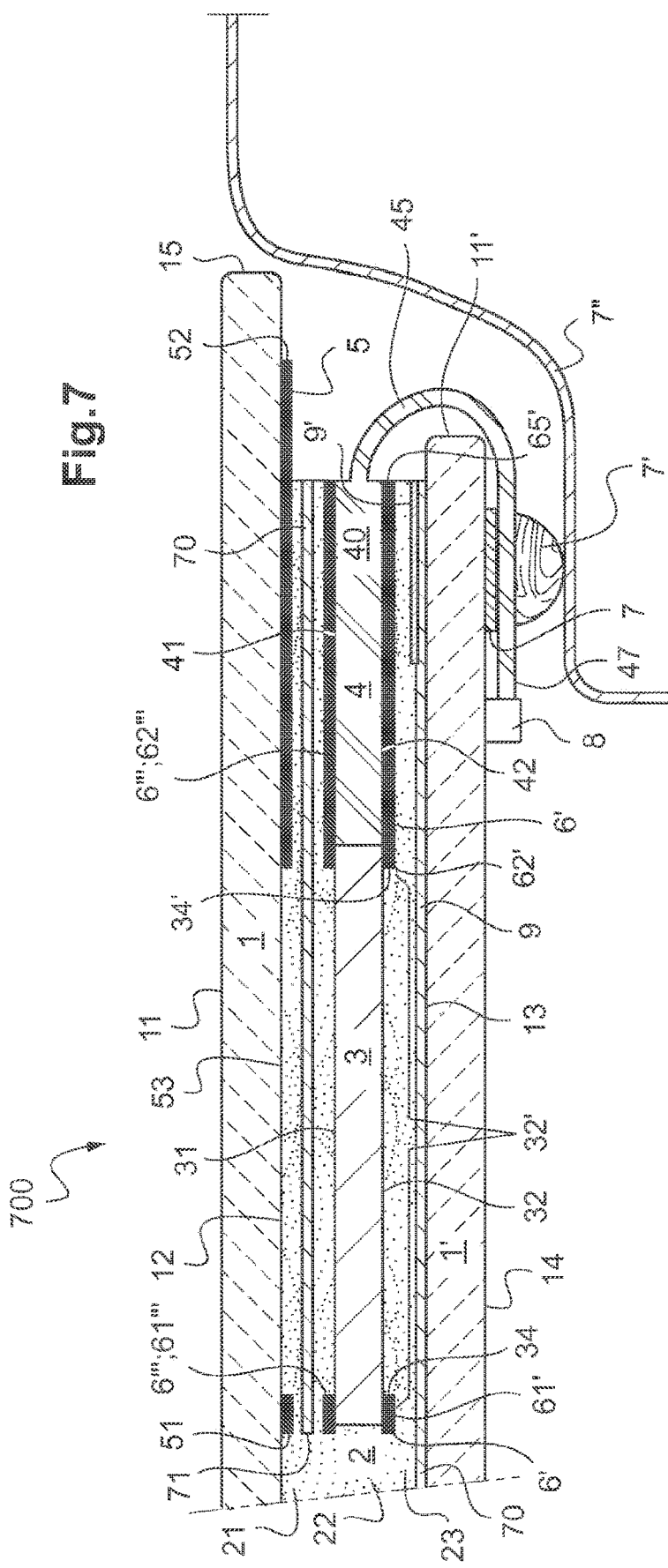

FIG. 7 is a sectional and partial schematic view of a windshield 700 with AMOLED screen of an automotive vehicle, inside view.

It differs from the windshield 600 by the replacement of the internal masking layer 6 by an opaque film 6' (as in FIG. 5) on the AMOLED screen and the FPC 40 on the front side.

It is also possible to use an opaque film 6'' (as in FIG. 5) on the AMOLED screen and the FPC 40 on the rear side in addition to or as replacement for the enamel of the edge 51.

The electromagnetic shielding element 70 here is transparent (conducting element of ITO, silvered layer, etc.).

Figure 8:
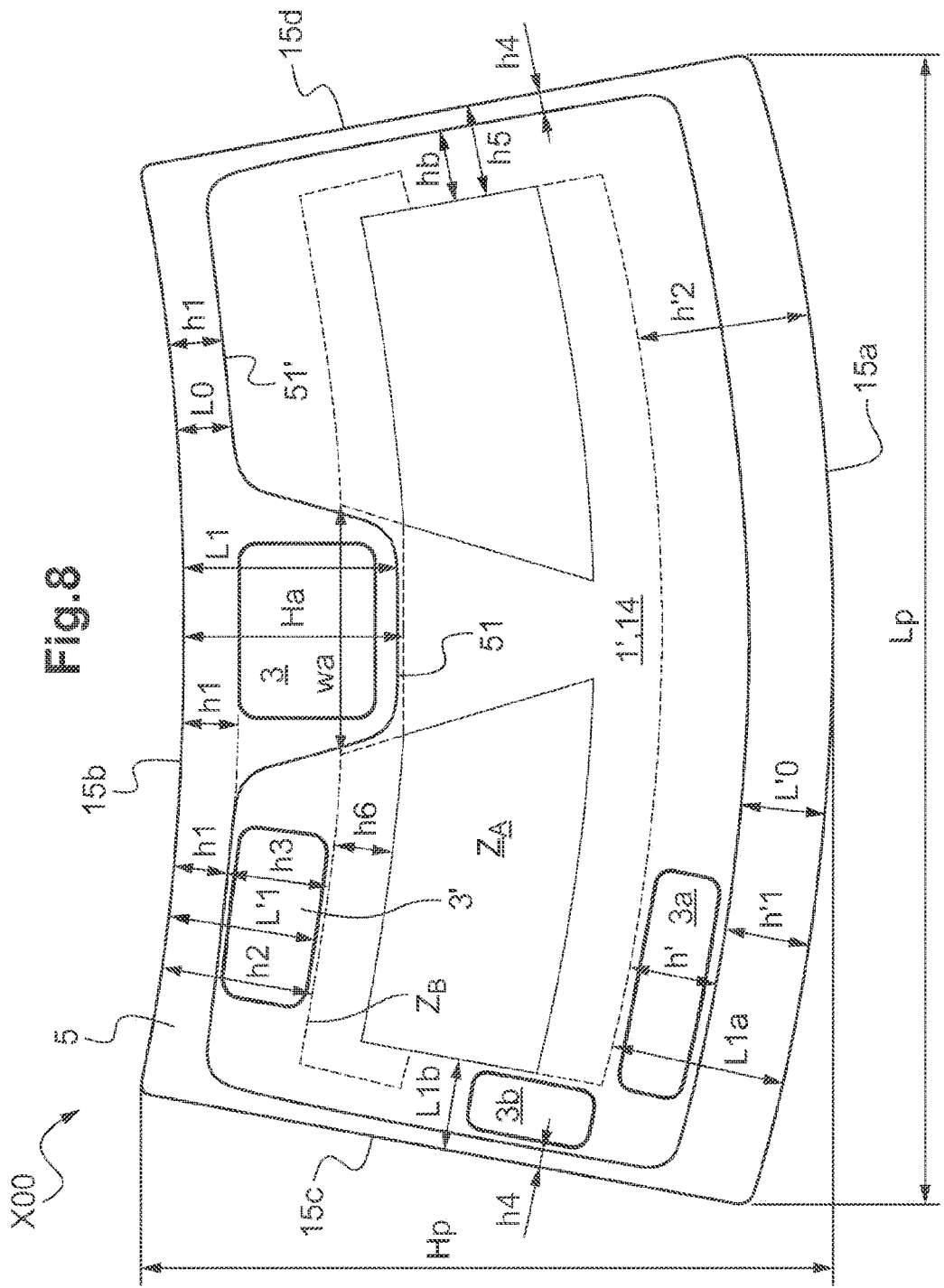

FIG. 8 is a face-on view of a road vehicle windshield which illustrates the possible peripheral zones for an opaque or slightly transparent or even very transparent AMOLED screen 3 (without rear masking) and shows the central transparent zone for a very transparent AMOLED screen 3.

This figure shows distances defining the limits of the vision zone of the driver (or copilot) and of the zone A $Z_A$ or of the restricted zone B $Z_B$.

The following pairs of distances are defined:
h1 distance between the upper edge of the windshield and the upper limit F of the peripheral zone of vision of the driver or of the copilot in the vehicle, preferably of at least 15 mm and h2 distance between the upper edge and the upper limit F' of the central zone of transparency on the driver's or copilot's side, of at least 120 mm, the AMOLED screen 3' is between said limits F and F' as well as preferably the optional other AMOLED screen(s) in this zone h'1 distance between the lower edge of the windshield and the lower limit F1 of the peripheral zone of vision of the driver or of the copilot in the vehicle preferably of at least 40 mm and h'2 distance between the lower edge and the lower limit F'1 of the central transparency zone on the driver's or copilot's side of at least 120 mm, the AMOLED screen 3a is between said limits F1 and F'1 as well as preferably the optional other AMOLED screen(s) in this zone h4 distance between the lateral edge of the windshield and the lateral limit F2 of the peripheral zone of vision of the driver in the vehicle preferably of at least 15 mm and h5 distance between the lateral edge and the lateral limit F'2 of the central zone of transparency on the drivers side or the copilot's side of at least 80 mm, the AMOLED screen 3b is between said limits F2 and F'2 as well as preferably the optional other AMOLED screen(s) in this zone h1 distance between the upper edge of the windshield and the upper limit F3 of the peripheral zone of vision of the driver or of the copilot in the vehicle, preferably of at least 15 mm and $H_a$ distance between the upper edge and the upper limit F'3 of the central transparency zone in the central part, of at least 180 mm, the AMOLED screen is between said limits F3 and F'3 as well as preferably the optional other AMOLED screen(s) in this zone.

The enamel limits L1, L1a, L1b are respectively substantially equal to h2, h'2, h5.

As a variant the AMOLED screen is not masked from the rear (enamel strip less wide) in particular if very transparent.

Preferably the width of the top central zone wa is at most 280 mm and the width of the central zone w'a is 300 mm (at the level of h2).

The (automotive) road vehicle windshield of rectangular shape is:
from 1350 to 1550 mm in width (horizontal dimension) Lp.
from 950 to 1050 mm in height (vertical dimension) Hp.

By way of example we have h1=70 mm; h2=195 mm; Ha=270 mm; wa=280 mm; w'a=300 mm; h6=75 mm; h'6=75 mm; h'=85 mm; h=125 mm.

The invention claimed is:
1. A laminated vehicle glazing, comprising:
a first glazing, with a first main face, to be oriented on the outside of the vehicle, and a second opposite main face, of thickness E1;
a lamination interlayer of polymeric substance, on the second main face side, of thickness E2;
a second glazing, with a third main face on the lamination interlayer side and a fourth opposite main face, to be oriented on the inside of the vehicle, of thickness E'1, at least one of the first and second glazings being made of mineral glass, between the second main face and the third main face, an organic light-emitting diode-based viewing screen, comprising a set of pixels, the organic light-emitting diode-based viewing screen comprising a zone of dynamic information display, of thickness E3 less than E2, the organic light-emitting diode-based viewing screen having a front main face oriented toward the third main face and a rear face oriented toward the second main face, the organic light-emitting diode-based viewing screen being covered by a non-zero thickness of lamination interlayer, wherein the organic light-emitting diode-based viewing screen is flexible and the laminated glazing comprises a first electromagnetic shielding element between the second main face and the rear face.

2. The laminated vehicle glazing as claimed in claim 1, wherein the organic light-emitting diode-based viewing screen is opaque or transparent with a luminous transmission LT of less than 10%, the first electromagnetic shielding element is masked by the organic light-emitting diode-based viewing screen or wherein in the zone with the first electromagnetic shielding element and the organic light-emitting diode-based viewing screen, the luminous transmission of the laminated glazing is at least 70%.

3. The laminated vehicle glazing as claimed in claim 1, wherein the organic light-emitting diode-based viewing screen is masked by an external periphery masking layer between the second main face and the rear face of the organic light-emitting diode-based viewing screen or wherein the organic light-emitting diode-based viewing screen is in a clear window region.

4. The laminated vehicle glazing as claimed in claim 1, wherein the first electromagnetic shielding element comprises electroconducting wires or else comprises an electroconducting element.

5. The laminated vehicle glazing as claimed in claim 1, wherein the first electromagnetic shielding element protrudes beyond edges of the organic light-emitting diode-based viewing screen.

6. The laminated vehicle glazing as claimed in claim 1, comprising a plurality of the organic light-emitting diode-based viewing screens, each with a first dedicated electromagnetic shielding element or with a first common electromagnetic shielding element.

7. The laminated vehicle glazing as claimed in claim 1, further comprising a second electromagnetic shielding element which is transparent between the front face of the organic light-emitting diode-based viewing screen and the third main face or the fourth main face.

8. The laminated vehicle glazing as claimed in claim 1, wherein the organic light-emitting diode-based viewing screen covers at most an entire peripheral zone visible by the driver in the road vehicle windshield up to an edge of the transparent central vision zone.

9. The laminated vehicle glazing as claimed in claim 1, comprising between the second main face and the fourth main face, an electroconducting layer or a set of electroconducting wires.

10. The laminated vehicle glazing as claimed in claim 9, wherein the electroconducting layer is on the third main face, is or on a flexible transparent polymeric film on the third main face side, and is a solar control and/or heating layer and covers at least 50% of the third main face.

11. The laminated vehicle glazing as claimed in claim 1, wherein technical edge or edges of the organic light-emitting diode-based viewing screen and of optional other organic light-emitting diode-based viewing screen(s) are masked by an interior masking element on the organic light-emitting diode-based viewing screen.

12. The laminated vehicle glazing as claimed in claim 1, wherein the organic light-emitting diode-based viewing screen has a thickness at most equal to 0.8 mm.

13. The laminated vehicle glazing as claimed in claim 1, wherein the laminated vehicle glazing forms a windshield of a road vehicle, with the first and second glazing cambered.

14. The laminated vehicle glazing as claimed in claim 9, wherein opposite the display zone, the electroconducting layer, or the set of electroconducting wires is absent.

15. A laminated vehicle glazing, comprising:
a first glazing, with a first main face, to be oriented on the outside of the vehicle, and a second opposite main face, of thickness E1;
a lamination interlayer of polymeric substance, on the second main face side, of thickness E2;
a second glazing, with a third main face on the lamination interlayer side and a fourth opposite main face, to be oriented on the inside of the vehicle, of thickness E'1, at least one of the first and second glazings being made of mineral glass,
between the second main face and the third main face, an organic light-emitting diode-based viewing screen, comprising a set of pixels, the organic light-emitting diode-based viewing screen comprising a zone of dynamic information display, of thickness E3 less than E2, the organic light-emitting diode-based viewing screen having a front main face oriented toward the third main face and a rear face oriented toward the second main face, the organic light-emitting diode-based viewing screen being covered by a non-zero thickness of lamination interlayer,
the organic light-emitting diode-based viewing screen including an electrical connection element, with a flexible so-called connecting part between the second main face and the third main face with a front surface on the third main face side and a rear surface on the second main face side, the flexible connecting part being covered by a non-zero thickness of lamination interlayer, the electrical connection element of thickness E4 less than E2, linked to the organic light-emitting diode-based viewing screen and extending the organic light-emitting diode-based viewing screen in the direction of the lip of the second glazing, the, flexible, electrical connection element extending outside of a lip of the second glazing via an exterior part,
wherein the organic light-emitting diode-based viewing screen is flexible and the laminated glazing comprises a first electromagnetic shielding element between the second main face and the rear face and/or between the second main face and the rear surface.

16. The laminated vehicle glazing as claimed in claim 15, wherein the organic light-emitting diode-based viewing screen is masked by an external periphery masking layer between the second main face and the rear face of the organic light-emitting diode-based viewing screen and the connecting part is also optionally masked by the external masking layer or wherein the organic light-emitting diode-based viewing screen is in a clear window region and the connecting part is optionally masked by an external masking layer between the second main face and the connecting part.

17. The laminated vehicle glazing as claimed in claim 15, wherein technical edge or edges of the organic light-emitting diode-based viewing screen and of optional other the organic light-emitting diode-based viewing screen(s) are masked by an interior masking element on the organic light-emitting diode-based viewing screen, and/or the electrical connection element or elements are masked by said interior masking element or another adjacent one.

18. The laminated vehicle glazing as claimed in claim 15, wherein the first electromagnetic shielding element is laminated by the lamination interlayer or on the second main face, masking the organic light-emitting diode-based viewing screen and/or the connecting part.

19. The laminated vehicle glazing as claimed in claim 15, wherein the first electromagnetic shielding element is on the organic light-emitting diode-based viewing screen and/or is on the connecting part.

20. The laminated vehicle glazing as claimed in claim 15, wherein the organic light-emitting diode-based viewing screen is transparent and in a clear window region or wherein the organic light-emitting diode-based viewing screen is masked by an external masking layer between the rear face of the organic light-emitting diode-based viewing screen and the second main face, and/or the electrical connection element is masked from the exterior by an external masking layer between the rear surface and the second main face.

21. The laminated vehicle glazing as claimed in claim 15, wherein the electrical connection element, of thickness E4 substantially equal to E2 and of thickness E'4 less than E4 beyond a lip of the second glazing, is curved and is against or fixed by gluing on the fourth main face without stretching as far as the display zone.

22. The laminated vehicle glazing as claimed in claim 15, wherein the second glazing bears on the third main face or fourth main face an internal masking layer arranged to mask from the interior:

technical edge or edges of the organic light-emitting diode-based viewing screen and optional other organic light-emitting diode-based viewing screen(s) that is or are adjacent or on distinct longitudinal edges, and/or the electrical connection element or elements of the organic light-emitting diode-based viewing screen and optional other organic light-emitting diode-based viewing screen(s) that is or are adjacent or on distinct longitudinal edges.

* * * * *

UNITED STATES PATENT AND TRADEMARK OFFICE
CERTIFICATE OF CORRECTION

PATENT NO. : 10,486,395 B2  
APPLICATION NO. : 16/067378  
DATED : November 26, 2019  
INVENTOR(S) : Michel Labrot et al.

Page 1 of 1

It is certified that error appears in the above-identified patent and that said Letters Patent is hereby corrected as shown below:

On the Title Page

Item (54) Invention Title and in the Specification, Column 1, Lines 1-2:  
Please correct the title as follows:  
LAMINATED VEHICLE GLAZING WITH AMOLED SCREEN Signed and Sealed this  
Fourth Day of February, 2020

Andrei Iancu  
*Director of the United States Patent and Trademark Office*